(12) United States Patent
Pon et al.

(10) Patent No.: US 9,001,878 B2
(45) Date of Patent: Apr. 7, 2015

(54) METHOD AND APPARATUS TO DETERMINE TIME AND DISTANCE BETWEEN TRANSCEIVERS USING PHASE MEASUREMENTS

(71) Applicant: QUALCOMM Incorporated, San Diego, CA (US)

(72) Inventors: Rayman Wai Pon, Cupertino, CA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/770,792

(22) Filed: Feb. 19, 2013

(65) Prior Publication Data

US 2014/0233624 A1    Aug. 21, 2014

(51) Int. Cl.
*H04B 3/46*         (2006.01)
*H04B 17/00*        (2006.01)
*H04Q 1/20*         (2006.01)
*H04W 24/00*        (2009.01)
(Continued)

(52) U.S. Cl.
CPC .............. *H04W 24/00* (2013.01); *H04J 3/0682* (2013.01); *H04L 43/0864* (2013.01); *G01S 5/14* (2013.01); *H04L 27/2665* (2013.01); *H04L 43/0858* (2013.01)

(58) Field of Classification Search
CPC ........................... H04J 3/0682; H04L 43/0864
USPC ................................ 375/226; 370/203–211
See application file for complete search history.

(56) References Cited

U.S. PATENT DOCUMENTS 7,254,204 B2    8/2007 Sang et al.
2005/0099942 A1*  5/2005 Kurihara ........................ 370/229
(Continued)

FOREIGN PATENT DOCUMENTS

JP         2008131309 A       6/2008

OTHER PUBLICATIONS

Aldana C, "802.11-2012 CID 46 47 48 ; 11-12-1249-02-000m-802-11-2012-cid-46-47-48", IEEE SA Mentor; 11-12-1249-02-000M-802-11-2012-CID-46-47-48, IEEE-SA Mentor; Piscataway, NJ USA, vol. 802.11m, No. 2, Nov. 15, 2012, pp. 1-17, XP068040036.
(Continued)

*Primary Examiner* — Curtis Odom
(74) *Attorney, Agent, or Firm* — Silicon Valley Patent Group LLP

(57) ABSTRACT

Systems, apparatuses and methods are disclosed for estimating a signal travel time, and thus distance between transceivers, in an orthogonal frequency division multiplexing (OFDM) system. The signal travel time is measured between a transmit time ($t_T$) and a receive window time ($t_{window}$) adjusted by the phase delay ($T_\Phi$). The phase delay ($T_\Phi$) is determined as a difference between a receive time ($t_R$) and the receive window time ($t_{window}$). The receive time ($t_R$) may be determined based on either an amplitude of the received signal at the receive window time ($t_{window}$) or when the received signal crosses a positive-negative axis. In synchronous systems, either a one-way time (OWT) or round-trip time (RTT) may be used for estimation. In asynchronous systems, an RTT is used for estimation.

17 Claims, 17 Drawing Sheets

(51) Int. Cl.
*H04J 3/06* (2006.01)
*H04L 12/26* (2006.01)
*G01S 5/14* (2006.01)
*H04L 27/26* (2006.01)

(56) References Cited

U.S. PATENT DOCUMENTS

2007/0286062 A1  12/2007  Gupta
2009/0323843 A1  12/2009  Yang et al.
2010/0247100 A1  9/2010  Lin et al.
2010/0329283 A1  12/2010  Luo et al.
2011/0002403 A1  1/2011  Wilhelmsson et al.
2011/0019567 A1  1/2011  Jiao et al.
2012/0114031 A1  5/2012  Li et al.

OTHER PUBLICATIONS

International Search Report and Written Opinion—PCT/US2014/012688—ISA/EPO—Jul. 21, 2014.

* cited by examiner

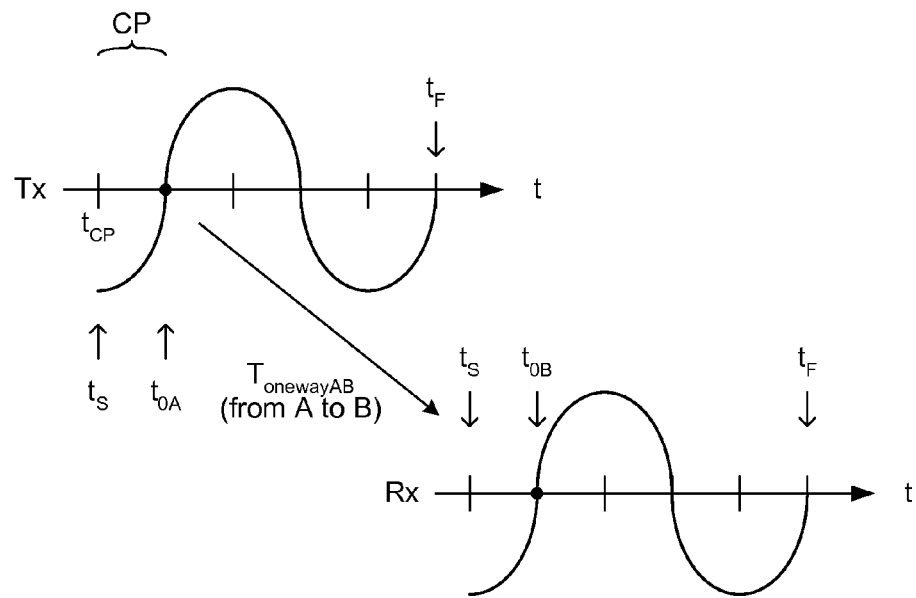
FIG. 5
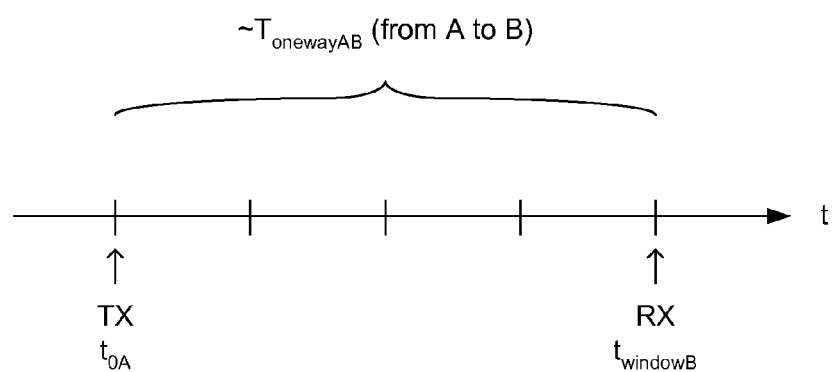
FIG. 6
$$T_{onewayAB} \approx \{ \overbrace{t_{windowB}}^{\text{Clock of receiver B}} - \overbrace{t_{0A}}^{\text{Clock of transmitter A}} \}$$
FIG. 7

$$T_{RRT} = T_{onewayAB} + T_{onewayBA}$$

FIG. 10

$$T_{RRT} \approx \left(t_{windowA} - t_{T1}\right) - TCF$$

FIG. 11

$$T_{onewayAB} = \left\{\left(\overbrace{t_{windowB} + T_{\phi B}}^{\text{B's clock}}\right) - \overbrace{t_{T1}}^{\text{A's clock}}\right\}$$

FIG. 12

$$T_{RRT} = \left\{\left(\overbrace{t_{windowB} + T_{\phi B}}^{\text{B's clock}}\right) - \overbrace{t_{T1}}^{\text{A's clock}}\right\} + \left\{\left(\overbrace{t_{windowA} + T_{\phi A}}^{\text{A's clock}}\right) - \overbrace{t_{T2}}^{\text{B's clock}}\right\}$$

FIG. 13

$$T_{RRT} = \left(\overbrace{t_{windowA} - t_{T1}}^{\text{A's clock}}\right) + \left(T_{\phi B} + T_{\phi A}\right) - \left(\overbrace{t_{T2} - t_{windowB}}^{\text{B's clock}}\right)$$

FIG. 14

$$T_{RRT} = \left(\overbrace{t_{windowA} - t_{T1}}^{\text{A's clock}}\right) + \left(T_{\phi B} + T_{\phi A}\right) - T_{TFC}$$

FIG. 15

METHOD AND APPARATUS TO DETERMINE TIME AND DISTANCE BETWEEN TRANSCEIVERS USING PHASE MEASUREMENTS

BACKGROUND

I. Field of the Invention

This disclosure relates generally to apparatus and methods for position estimation of a wireless device, and more particularly to determining a time of arrival in RTT (round-trip time) systems or OWT (one way time) if the systems are synchronous.

II. Background

To assist in position estimation, a mobile device may capture received signal strength indication (RSSI) measurements from three or more access points. A server or the mobile device itself may apply trilateration to these RSSI measurements using a distance model based on RSSI to estimate a position of the mobile device. Unfortunately, trilateration with RSSI measurements results in a high level of uncertainty in position estimation because of the uncertainty of the RSSI measurement themselves and dependency on an accurate distance model based on RSSI measurements.

Round-trip time (RTT) or one way time (OWT) measurements advantageously have a much lower level of distance uncertainty than the RSSI measurements. RTT measurements record a round-trip time starting with an initial signal being transmitted, accounting for remote transceiver processing delays, and ending with a final signal being received. For example, a signal is transmitted from a mobile device to an access point and back to the mobile device. Though several uncertainties exist (such as processing delays with the remote transceiver) with RTT measurement, these variables may be determined or estimated. A server or a mobile device may use the RTT measurements in trilateration to more accurately estimate the position of the mobile device.

Unfortunately, determining when a signal is received may be inaccurate up to 20% or 25% of a width of an OFDM symbol, therefore, other means are used to determine RTT. A more precise method is needed to eliminate this inherent and unknown offset so this windowing method may be used.

BRIEF SUMMARY

According to some aspects, disclosed is a method for estimating a round-trip time (RTT) in an orthogonal frequency division multiplexing (OFDM) system, the method comprising: transmitting a first OFDM signal at a first transmit time ($t_{T1}$) from a first transceiver to a second transceiver; receiving, at the first transceiver and from the second transceiver, a second OFDM signal in a window A having a window A start time ($t_{windowA}$); and determining a window A phase difference ($T_{\Phi A}$) from a first difference of a receive time ($t_{R2}$) of the second OFDM signal and a window A start time ($t_{windowA}$) of the window A.

According to some aspects, disclosed is an apparatus for estimating a round-trip time (RTT) in an orthogonal frequency division multiplexing (OFDM) system, the apparatus comprising: means for transmitting a first OFDM signal at a first transmit time ($t_{T1}$) from a first transceiver to a second transceiver; means for receiving, at the first transceiver and from the second transceiver, a second OFDM signal in a window A having a window A start time ($t_{windowA}$); and means for determining a window A phase difference ($T_{\Phi A}$) from a first difference of a receive time ($t_{R2}$) of the second OFDM signal and a window A start time ($t_{windowA}$) of the window A.

According to some aspects, disclosed is an apparatus for estimating a round-trip time (RTT) in an orthogonal frequency division multiplexing (OFDM) system, the apparatus comprising: a first transceiver comprising: a transmitter configured to transmit a first OFDM signal at a first transmit time ($t_{T1}$) from the first transceiver to a second transceiver; and a receiver configured to receive, at the first transceiver and from the second transceiver, a second OFDM signal in a window A having a window A start time ($t_{windowA}$); and a processor coupled to the first transceiver and configured to determine a window A phase difference ($T_{\Phi A}$) from a first difference of a receive time ($t_{R2}$) of the second OFDM signal and the window A start time ($t_{windowA}$).

According to some aspects, disclosed is a non-transitory computer-readable storage medium transceiver for estimating a round-trip time (RTT) in an orthogonal frequency division multiplexing (OFDM) system, the non-transitory computer-readable storage medium including program code stored thereon, comprising program code to: transmit a first OFDM signal at a first transmit time ($t_{T1}$) from a first transceiver to a second transceiver; receive, at the first transceiver and from the second transceiver, a second OFDM signal in a window A having a window A start time ($t_{windowA}$); and determine a window A phase difference ($T_{\Phi A}$) from a first difference of a receive time ($t_{R2}$) of the second OFDM signal and a window A start time ($t_{windowA}$) of the window A.

According to some aspects, disclosed is a method for estimating a receive time of a first OFDM signal in an orthogonal frequency division multiplexing (OFDM) system, the method comprising: receiving, from a first transceiver and at a second transceiver, the first OFDM signal in a window B having a window B start time ($t_{windowB}$); and determining a window B phase difference ($T_{\Phi B}$) from a first difference between a receive time ($t_{R1}$) of the first OFDM signal and the window B start time ($t_{windowB}$).

According to some aspects, disclosed is an apparatus for estimating a receive time of a first OFDM signal in an orthogonal frequency division multiplexing (OFDM) system, the apparatus comprising: means for receiving, from a first transceiver and at a second transceiver of the apparatus, the first OFDM signal in a window B having a window B start time ($t_{windowB}$); and means for determining a window B phase difference ($T_{\Phi B}$) from a first difference between a receive time ($t_{R1}$) of the first OFDM signal and the window B start time ($t_{windowB}$).

According to some aspects, disclosed is an apparatus for estimating a receive time in an orthogonal frequency division multiplexing (OFDM) system, the apparatus comprising: a second transceiver comprising a receiver configured to receive, from a first transceiver and at the second transceiver, a first OFDM signal in a window B having a window B start time ($t_{windowB}$); and a processor coupled to the second transceiver and configured to determine a window B phase difference ($T_{\Phi B}$) from a first difference between a receive time ($t_{R1}$) of the first OFDM signal and the window B start time ($t_{windowB}$).

According to some aspects, disclosed is a non-transitory computer-readable storage medium for estimating a receive time in an orthogonal frequency division multiplexing (OFDM), the non-transitory computer-readable storage medium including program code stored thereon, comprising program code to: receive, from a first transceiver and at a second transceiver, a first OFDM signal in a window B having a window B start time ($t_{windowB}$); and determine a window B phase difference ($T_{\Phi B}$) from a first difference between a receive time ($t_{R1}$) of the first OFDM signal and the window B start time ($t_{windowB}$).

According to some aspects, disclosed is a method for estimating a one-way time (OWT) in an orthogonal frequency division multiplexing (OFDM) system, the method comprising: receiving an OFDM signal at a first transmit time ($t_{T1}$) from a first transceiver sent to a second transceiver in a window B having a window B start time ($t_{windowB}$); and determining a window B phase difference ($T_{\Phi B}$) from a first difference of a receive time ($t_{R1}$) of the OFDM signal and the window B start time ($t_{windowB}$) of the window B; wherein the first transceiver and the second transceiver are synchronous.

According to some aspects, disclosed is an apparatus for estimating a one-way time (OWT) in an orthogonal frequency division multiplexing (OFDM) system, the apparatus comprising: means for receiving an OFDM signal at a first transmit time ($t_{T1}$) from a first transceiver sent to the apparatus in a window B having a window B start time ($t_{windowB}$); and means for determining a window B phase difference ($T_{\Phi B}$) from a first difference of a receive time ($t_{R1}$) of the OFDM signal and the window B start time ($t_{windowB}$) of the window B; wherein the first transceiver and the second transceiver are synchronous.

According to some aspects, disclosed is an apparatus for estimating a one-way time (OWT) in an orthogonal frequency division multiplexing (OFDM) system, the apparatus comprising: a second transceiver configured to receive an OFDM signal at a first transmit time ($t_{T1}$) from a first transceiver sent to the apparatus in a window B having a window B start time ($t_{windowB}$); and a processor coupled to the second transceiver and configured to determine a window B phase difference ($T_{\Phi B}$) from a first difference of a receive time ($t_{R1}$) of the OFDM signal and the window B start time ($t_{windowB}$) of the window B; wherein the first transceiver and the second transceiver are synchronous.

According to some aspects, disclosed is a non-transitory computer-readable storage medium for estimating a one-way time (OWT) in an orthogonal frequency division multiplexing (OFDM) system, the non-transitory computer-readable storage medium including program code stored thereon, comprising program code to: receive an OFDM signal at a first transmit time ($t_{T1}$) from a first transceiver sent to a second transceiver in a window B having a window B start time ($t_{windowB}$); and determine a window B phase difference ($T_{\Phi B}$) from a first difference of a receive time ($t_{R1}$) of the OFDM signal and a window B start time ($t_{windowB}$) of the window B.

According to some aspects, disclosed is a method for estimating a one-way time (OWT) in an orthogonal frequency division multiplexing (OFDM) system, the method comprising: receiving an OFDM signal at a transmit time ($t_{T2}$) at a first transceiver and from a second transceiver in a window A having a window A start time ($t_{windowA}$); receiving the transmit time ($t_{T2}$) from the second transceiver sent to the first transceiver; determining a window A phase difference ($T_{\Phi A}$) from a first difference of a receive time ($t_{R2}$) of the OFDM signal and a window A start time ($t_{windowA}$) of the window A; and computing the OWT based on: the window A start time ($t_{windowA}$) of the window A; the window A phase difference ($T_{\Phi A}$); and the transmit time ($t_{T2}$); wherein the first transceiver and the second transceiver are synchronous.

According to some aspects, disclosed is an apparatus for estimating a one-way time (OWT) in an orthogonal frequency division multiplexing (OFDM) system, the apparatus comprising: means for receiving an OFDM signal at a transmit time ($t_{T2}$) at a first transceiver and from a second transceiver in a window A having a window A start time ($t_{windowA}$); means for receiving the transmit time ($t_{T2}$) from the second transceiver sent to the first transceiver; means for determining a window A phase difference ($T_{\Phi A}$) from a first difference of a receive time ($t_{R2}$) of the OFDM signal and a window A start time ($t_{windowA}$) of the window A; and means for computing the OWT based on: the window A start time ($t_{windowA}$) of (the window A; the window A phase difference ($T_{\Phi A}$); and the transmit time ($t_{T2}$); wherein the first transceiver and the second transceiver are synchronous.

According to some aspects, disclosed is an apparatus for estimating a one-way time (OWT) in an orthogonal frequency division multiplexing (OFDM) system, the apparatus comprising: a first transceiver configured to: receive the OFDM signal at a transmit time ($t_{T2}$) from the second transceiver sent to the first transceiver in a window A having a window A start time ($t_{windowA}$); and receive the transmit time ($t_{T2}$) from the second transceiver sent to the first transceiver; and a processor coupled to the first transceiver and configured to: determine a window A phase difference ($T_{\Phi A}$) from a first difference of a receive time ($t_{R2}$) of the OFDM signal and a window A start time ($t_{windowA}$) of the window A; and compute the OWT based on: the window A start time ($t_{windowA}$) of the window A; the window A phase difference ($T_{\Phi A}$); and the transmit time ($t_{T2}$); wherein the first transceiver and the second transceiver are synchronous.

According to some aspects, disclosed is a non-transitory computer-readable storage medium for estimating a one-way time (OWT) in an orthogonal frequency division multiplexing (OFDM) system, the non-transitory computer-readable storage medium including program code stored thereon, comprising program code to: receive an OFDM signal at a transmit time ($t_{T2}$) at a first transceiver and from a second transceiver in a window A having a window A start time ($t_{windowA}$); receive the transmit time ($t_{T2}$) from the second transceiver sent to the first transceiver; determine a window A phase difference ($T_{\Phi A}$) from a first difference of a receive time ($t_{R2}$) of the OFDM signal and a window A start time ($t_{windowA}$) of the window A; and compute the OWT based on: the window A start time ($t_{windowA}$) of the window A; the window A phase difference ($T_{\Phi A}$); and the transmit time ($t_{T2}$); wherein the first transceiver and the second transceiver are synchronous.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

Embodiments of the invention will be described, by way of example only, with reference to the drawings.

FIGS. 3, 4 and 5 show a subcarrier carrying a first order pilot signal of an OFDM symbol in the time domain.

FIGS. 6 and 7 illustrate a one-way signal time.

FIGS. 10-15 are equations associated with RTT signaling, in accordance with some embodiments of the present invention.

DETAILED DESCRIPTION

Figure 1:
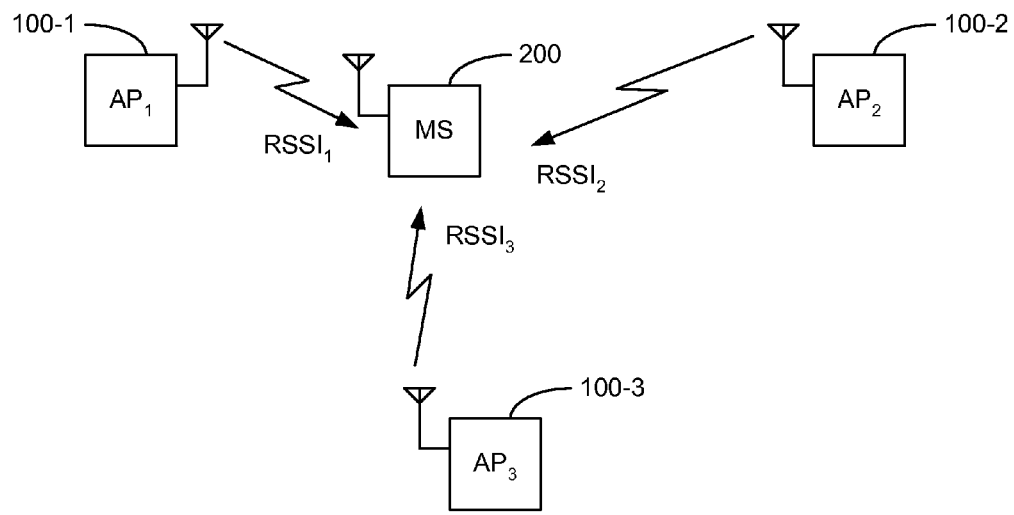
FIG. 1 illustrates trilateration using RSSI measurements.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

For reference, in an IEEE 802.11n system, an OFDM symbol (without a cyclic prefix) is 3.2 milliseconds (ms). An OFDM frame length (or an OFDM symbol with a cyclic prefix) is 4.0 ms. A cyclic prefix is 0.8 ms.

Consider a case with a first transceiver A and a second transceiver B. The transceivers may be a mobile device and an access point. Round-trip time (RTT) is determined by sending a first OFDM signal from the first transceiver A to the second transceiver B and then sending a second OFDM signal from the second transceiver B back to the first transceiver A. The first transceiver A may have a clock AA asynchronous with clock BB of the second transceiver B.

For reference, the following times t are defined. Internal clock times are represented with a variable t. A subscript 'A' or '1' is used when referencing an event associated with the first transceiver A. A subscript 'B' or '2' is used when referencing an event associated with the second transceiver B. The time the first OFDM signal is transmitted from the first transceiver is $t_{T1}$. The time the first OFDM signal is received at the second transceiver is $t_{R1}$. The time the second OFDM signal is transmitted from a second transceiver is $t_{T2}$. The time the second OFDM signal is received by the first transceiver is $t_{R2}$. The processing delay or estimated latency within the second transceiver is $T_{TCF}=(t_{T2}-t_{R1})$. An OFDM signal is received (either first at the second transceiver B or later at the first transceiver A) in a reception window having a start time $t_{window}$ and is asynchronous from the start of the OFDM signal as received at time $t_R$.

Periods or durations of time are represented with a variable T. The period of time between the window start time $t_{window}$ and the start of the OFDM signal as received $t_R$ is represented as $T_\Phi$. The variable $T_\Phi$ may be in terms of time or equivalently in terms of degrees of phase (e.g., 0° to 45°). Specifically, for the first OFDM signal received by the second transceiver B, the period of time between the second window B start time $t_{windowB}$ and the start of the first OFDM signal as received $t_{R1}$ is represented as $T_{\Phi B}$. For the second OFDM signal received by the first transceiver A, the period of time between the first window A start time $t_{windowA}$ and the start of the second OFDM signal as received $t_{R2}$ is represented as $T_{\Phi A}$.

As explained above, the period of time that the second transceiver B takes to receive and process the first OFDM signal, then to transmit the second OFDM signal is a time-cost function or latency represented by $T_{TCF}$. Finally, the period of time the first and second OFDM signals are traveling are represented by $T_{onewayAB}$ (from the first transceiver A to the second transceiver B) and $T_{onewayBA}$ (from the second transceiver B back to the first transceiver A), respectfully.

FIG. 1 illustrates trilateration using RSSI measurements. At least three access points (shown as $AP_1$ 100-1, $AP_2$ 100-2 and $AP_3$ 100-3) transmit a signal ($RSSI_1$, $RSSI_2$ and $RSSI_3$), respectively. The mobile device (MS 200) receives the transmitted signals from the access points at various levels. With knowledge of the original transmit level and the received level, a difference shows the path attenuation, which corresponds to a distance. Knowing three or more locations of transmitters and corresponding distances to those transmitters derived from the RSSI signals, MS 200 may approximate its position via trilateration.

Figure 2:
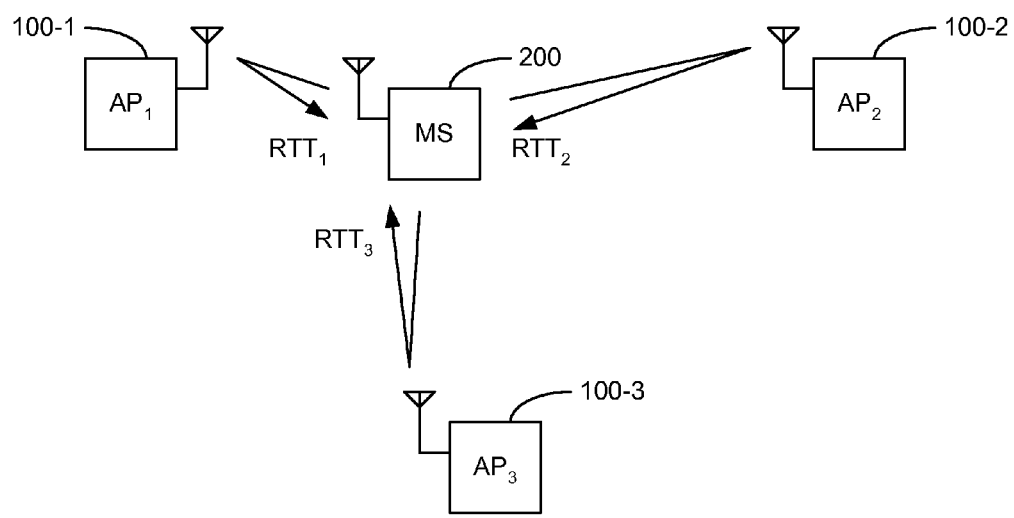
FIG. 2 illustrates trilateration using RTT measurements.

FIG. 2 illustrates trilateration using RTT measurements. Either the access point or the mobile device may initiate an RTT signal. In the case shown, MS 200 initiates a signal, which each access point (shown as $AP_1$ 100-1, $AP_2$ 100-2 and $AP_3$ 100-3) receives and retransmits back to MS 200. MS 200 receives these signals at various times. Each time delay reflects a path delay, which again corresponds to a distance. With three distances from the RTT signals, MS 200 may approximate its position via trilateration.

Figure 3:
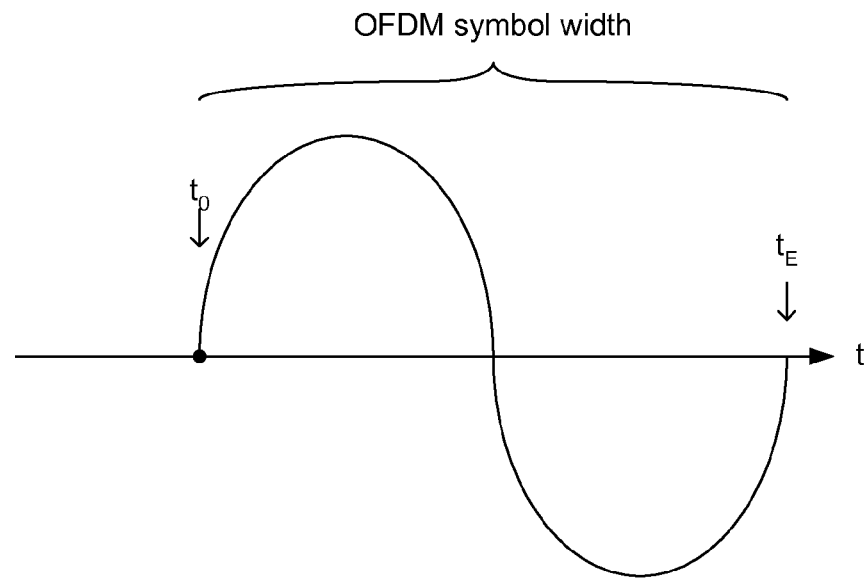
Figure 4:
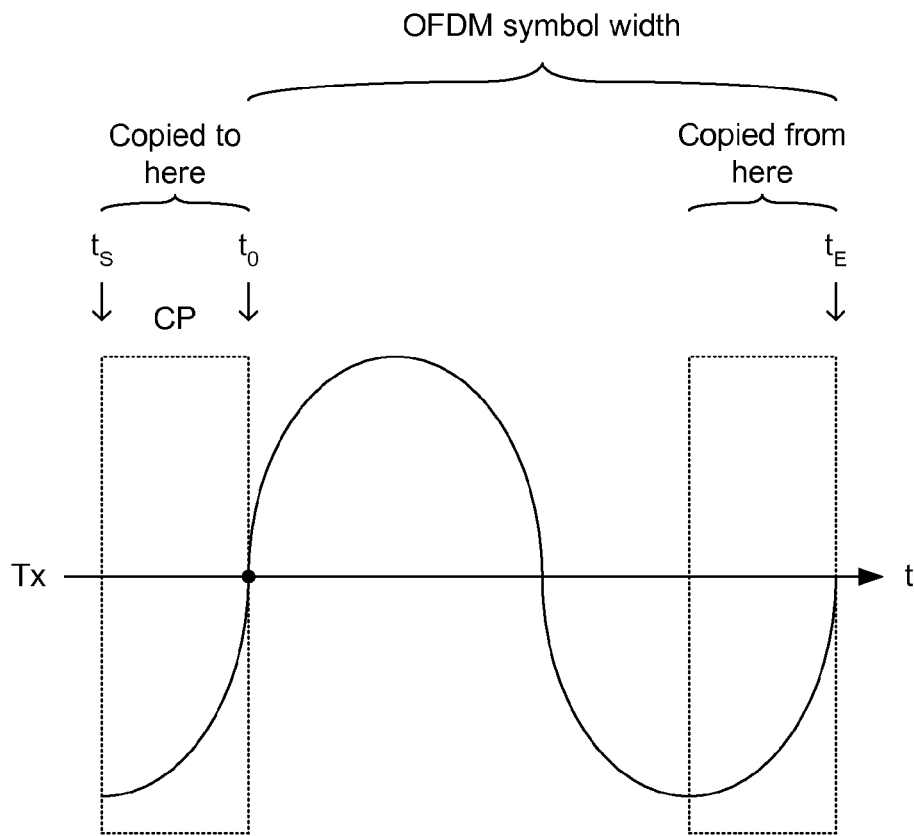

FIGS. 3, 4 and 5 show a subcarrier carrying a first order pilot signal of an OFDM symbol in the time domain. FIG. 3 shows one sub-channel of an OFDM symbol. The OFDM symbol is an example pilot signal having a single sinusoidal wave. The information signal begins at $t_0$ and ends at $t_E$.

FIG. 4 shows how a transmitted OFDM symbol includes a cyclic prefix (CP) taken from then last 25% of the symbol and copied to the beginning of the transmitted OFDM symbol. The timeline begins at $t_S$ and continues to $t_0$ with the CP. The timeline then continues from $t_0$ to $t_E$ with the OFDM symbol. The difference between $t_0$ and $t_E$ is the OFDM symbol width. The difference between $t_S$ and $t_E$ is the entire transmitted OFDM symbol with the CP. The transmitted OFDM symbol starts with a CP copied to $t_S$ to $t_0$ from the last 25% of the OFDM symbol.

FIG. 5 shows a delay of the signal traveling from a first transmitter A to a second transmitter B. The start of the OFDM symbol with CP is shown as $t_{CP}=t_S$. The beginning of the OFDM symbol with CP is shown as $t_0=t_{0A}$ at the first transceiver A and $t_0=t_{0B}$ at the second transceiver B. The end of the OFDM symbol is shown as $t_E=t_F$. The travel time from the first transmitter A to the second transmitter B is shown as $T_{onewayAB}$.

FIGS. 6 and 7 illustrate a one-way signal time. In FIG. 6, a unified timeline shows an approximation of $T_{onewayAB}$ as the period from transmission TX $t_{0A}$ to reception RX $t_{windowB}$. The receive window, which begins at $t_{windowB}$, includes a variable part of the CP, which incorporates a first uncertainty that makes $T_{onewayAB}$ an approximation.

In FIG. 7, a mathematical representation of $T_{onewayAB}$ is shown. The oneway time from the first transceiver A to the second transceiver B is $T_{onewayAB}$. A approximation of $T_{onewayAB}$ is found from a difference of $t_{windowB}$ (the beginning of the receiver window on the second transceiver B) and $t_{0A}$ (the beginning of the transmission of the OFDM symbol without CP). Unfortunately, $t_{windowB}$ is known according to the clock of the second transceiver B and $t_{0A}$ is known according to the clock of the first transceiver A, thus causing a second uncertainty.

Figure 8:
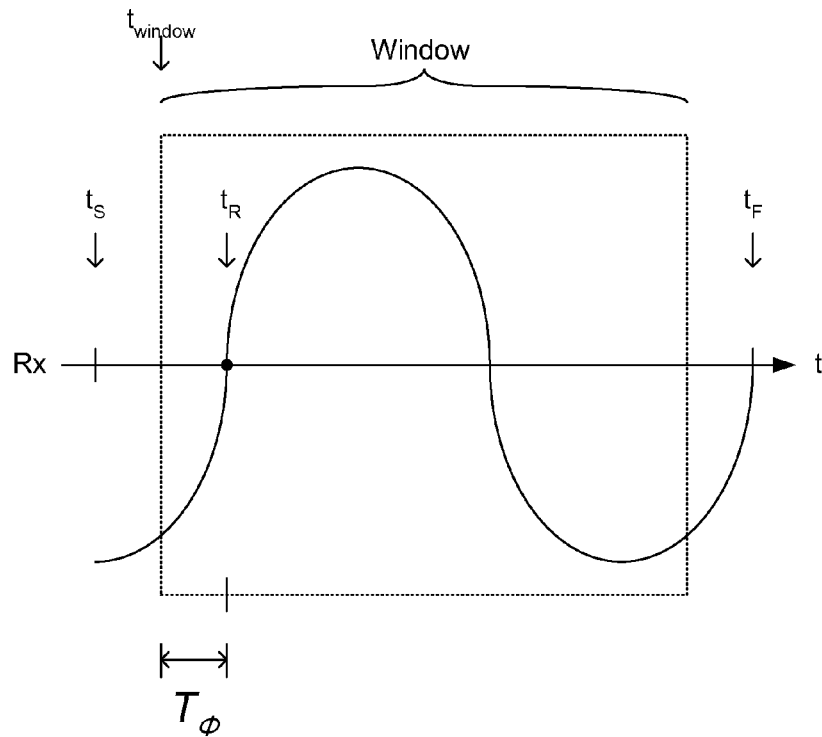
FIG. 8 show a receive window of an OFDM subcarrier.

FIG. 8 show a receive window of an OFDM subcarrier. Generally, the receive window begins at $t_{window}$ and includes a variable part of the transmitted CP. The window width is equal to an OFDM symbol without the CP. Before the beginning of the receive window at $t_{window}$, the OFDM symbol with the CP arrives at the receiver. A period between when the window begins at $t_{window}$ and the beginning of the OFDM symbol $t_R$, is shown as $T_\Phi$. After the end of the receive window, the OFDM symbol continues to arrive at the receiver until time $t_F$.

Specifically, the receive time ($t_R$) of the OFDM symbol may be erroneously estimated as the beginning of the receive window ($t_{window}$). The transmitted OFDM frame (CP+symbol) is 4.0 ms long (0.8 ms+3.2 ms) but the receive window is only 3.2 ms wide. However, the receive window does not necessarily start at the beginning of the OFDM symbol $t_R$. The receive window can start anywhere within the first 0.8 ms and lasts for 3.2 ms. The receive window most likely starts within some time during the cycle prefix. Therefore, the beginning of the receive window is usually not the beginning of the (non-CP) OFDM symbol, however, conventional systems set the beginning of the receive window ($t_{window}$) as the beginning of the OFDM symbol. Unfortunately, this offset of the OFDM symbol receive time to the beginning of the receive window ($t_{window}$) incorporates up to 25% of an OFDM symbol length of time, which shows as a distance error of up to several kilometers.

In response, embodiments use the phase offset found in the received OFDM signal to determine where the (non-CP) OFDM symbol actually begins ($t_R$) and adjust the received OFDM signal time accordingly rather than simply using the beginning of the receive window ($t_{window}$) as the OFDM start time. This phase offset is shown as $T_\Phi$, which may be a time, variable count or angle between $t_R$ and $t_{window}$. The time $t_R$ may be determined either based on wave height at $t_{window}$ or when the OFDM wave crosses the x-axis.

Figure 9:
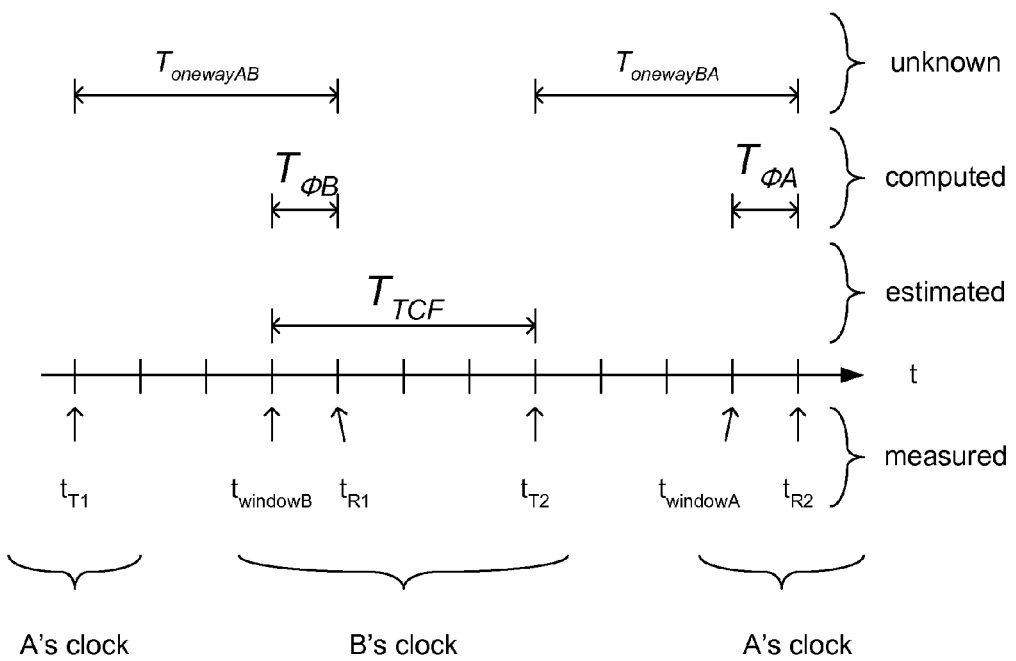
FIG. 9 illustrates various times in RTT signaling.

FIG. 9 illustrates various times in RTT signaling. According to the clock in the first transceiver A, time $t_{T1}$ is when the OFDM symbol is transmitted. According to the clock in the second transceiver B, time $t_{windowB}$ is at the start of window B, time $t_{R1}$ is when the OFDM waveform crosses the x-axis (that is, the time between the CP and the OFDM symbol at the receiver), and the time $t_{T2}$ is the time the second OFDM symbol is transmitted. Also, according to the clock in the first transceiver A, time $t_{windowA}$ is at the start of window B, and time $t_{R2}$ is the time the second OFDM symbol is received.

The latency period $T_{TCF}$ in the second transceiver is estimated and runs from $t_{windowB}$ to $t_{T2}$. The period $T_{\Phi B}$ is the window B phase difference and runs from $t_{windowB}$ to $t_{R1}$. The period $T_{\Phi A}$ is the window A phase difference and runs from $t_{windowA}$ to $t_{R2}$. The period $T_{onewayAB}$ is a period of time the first OFDM signal is traveling from the first transceiver A to the second transceiver B. The period $T_{onewayBA}$ is a period of time the second OFDM signal is traveling from the second transceiver B to the first transceiver A.

FIGS. 10-15 are equations associated with RTT signaling, in accordance with some embodiments of the present invention. Round-trip time (RTT) may be computed theoretically by combining the outbound signal travel time and inbound signal travel time, as shown in FIG. 10. That is, $T_{RRT} = T_{onewayAB} \, T_{onewayBA}$. Alternatively, RTT may be estimated from a difference of the first transmission ($t_{T1}$) to the last reception ($t_{R2}$) less the estimated latency (also known as the time cost function or $T_{TCF}$) in the middle transceiver, as shown in FIG. 11. That is, $T_{RRT} \approx (t_{windowA} - t_{T1}) - TCF$.

FIG. 12 shows the one-way travel time ($T_{onewayAB}$) computed as the difference between transmit time ($t_{T1}$) and reception time ($t_{windowB}$) adjusted by the signal phase ($T_{\Phi B}$). That is, $T_{onewayAB} = \{(t_{windowB} \, T_{\Phi B}) - t_{T1}\}$. Time $t_{windowB}$ is associated with the clock of the second transceiver B. Time $t_{T1}$ is associated with the clock of the first transceiver A. Similarly, the reverse one-way travel time is computed as $T_{onewayBA} = \{(t_{windowA} + T_{\Phi A}) - t_{T2}\}$.

FIG. 13 shows the period $T_{RRT}$ after these equations (described above with reference to FIG. 12) is substituted into the equation of FIG. 10. That is, $T_{RRT} = \{(t_{windowB} + T_{\Phi B}) - t_{T1}\} + \{(t_{windowA} + T_{\Phi A}) - t_{T2}\}$. Times $t_{windowB}$ and $t_{T2}$ are associated with the clock of the second transceiver B. Times $t_{windowA}$ and $t_{T1}$ are associated with the clock of the first transceiver A.

FIG. 14 regroups the variable of the equation of FIG. 13 based on which clock the variable is associated. In this case, $T_{RRT} \, \{(t_{windowA} - t_{T1}) + (T_{\Phi B} + T_{\Phi A}) - (t_{T2} - t_{windowB})\}$. Time ($t_{windowA} - t_{T1}$) is associated with the clock of the first transceiver A. Time ($t_{T2} - t_{windowB}$) is associated with the clock of the second transceiver B.

FIG. 15 substitutes the latency definition of $T_{TCF} = (t_{T2} - t_{windowB})$ into the equation of FIG. 14 to result in an equation that is independent of clock BB in the second transceiver B. That is, $T_{RRT}\{(t_{windowA} - t_{T1}) + (T_{\Phi B} + T_{\Phi A}) - (T_{TFC})\}$. Time ($t_{windowA} - t_{T1}$) is associated with the clock of the first transceiver A. No time is associated with the clock of the second transceiver B.

Figure 16:
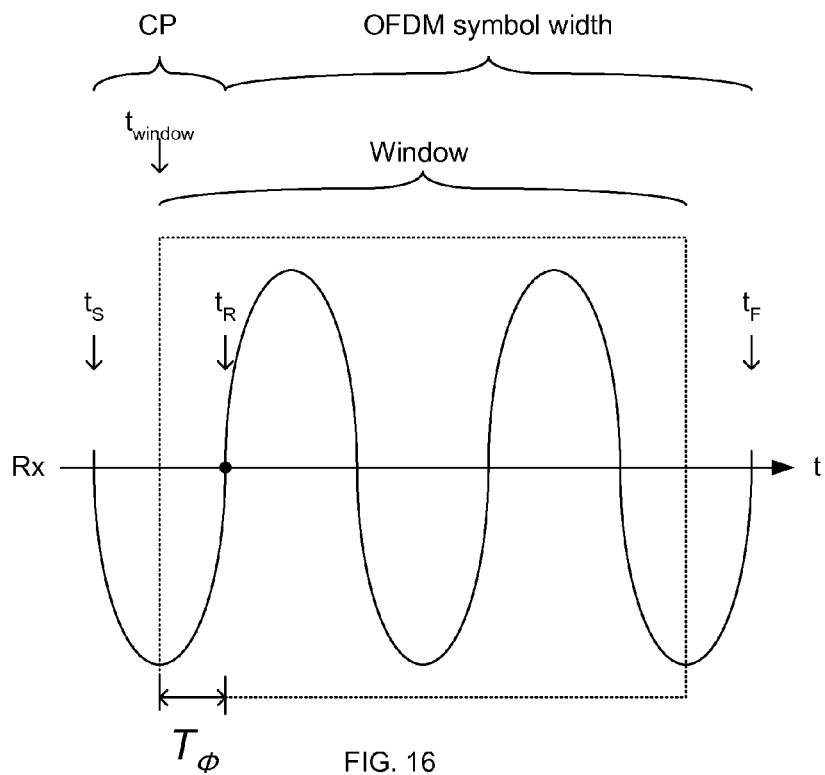
FIGS. 16-19 show higher order pilot signals of an OFDM symbol in the time domain, in accordance with some embodiments of the present invention.

FIGS. 16-19 show higher order pilot signals of an OFDM symbol in the time domain, in accordance with some embodiments of the present invention. In FIG. 16, a two-cycle pilot signal is shown. The CP is a half-cycle signal attached to the beginning of the two-cycle OFDM symbol. The two-cycle pilot signal begins with a CP signal from $t_S$ to $t_R$ and then the two-cycle signal from $t_R$ to $t_F$. Only a fraction of the ending CP signal of period $T_\Phi$ resides in the receive window, which starts at $t_{window}$. A large fraction of the OFDM symbol starting at $t_R$ is in the receive window as well. A copy of the tail end of the OFDM symbol is found at the beginning of the window as the CP signal.

Figure 17:
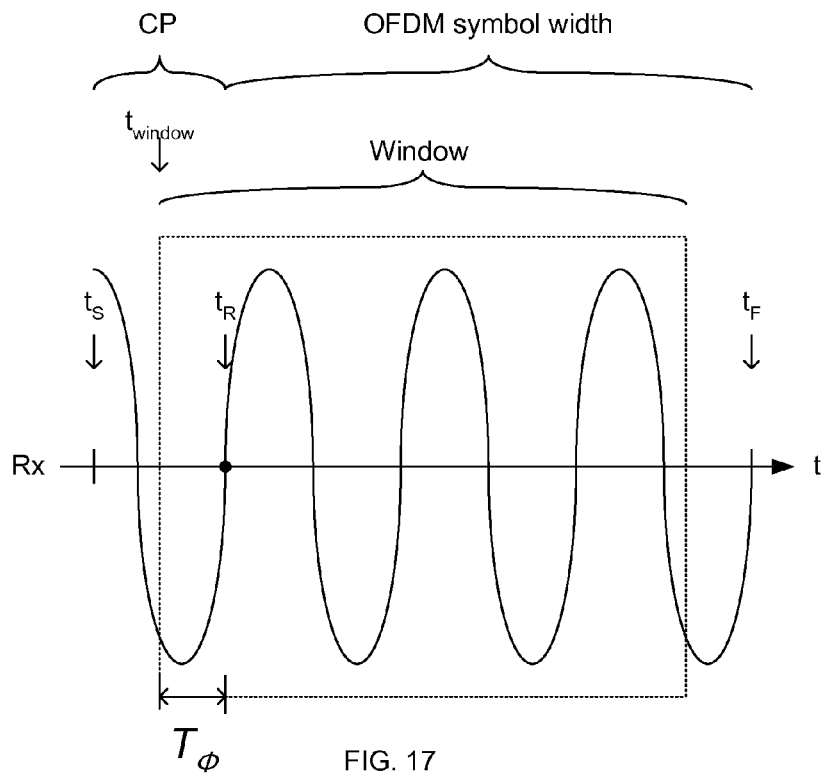
Figure 18:
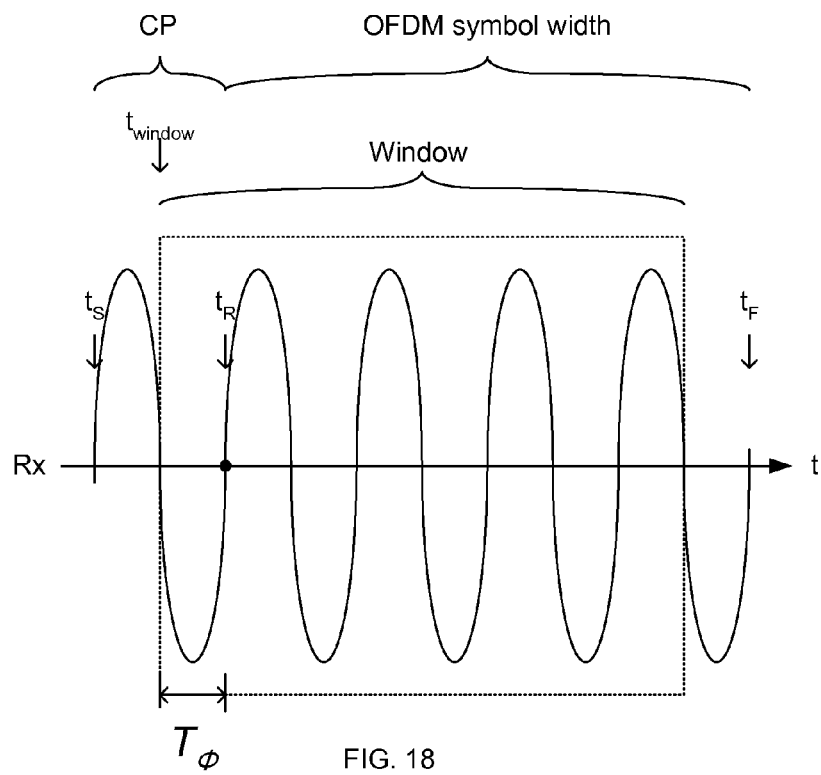

In FIG. 17, a three-cycle pilot signal is shown. The CP is ¾ of a symbol cycle copied from the tail of the three-cycle OFDM symbol. Similarly, FIG. 18 shows a four-cycle signal.

Figure 19:
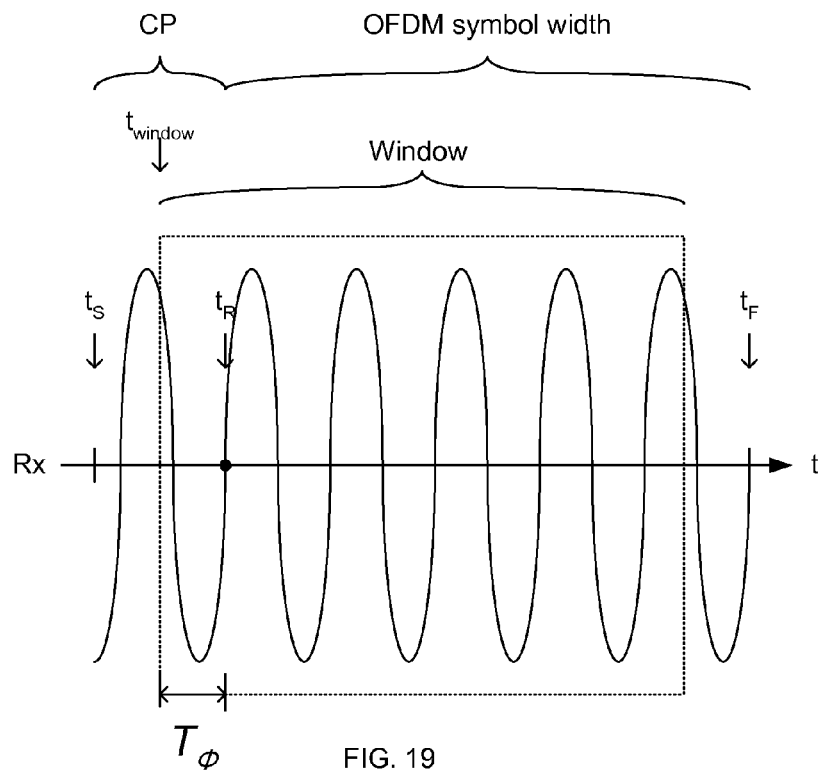

The CP is a full cycle copied from the end of the four-cycle OFDM symbol. FIG. 19 shows a five-cycle signal. The CP is a 1.25 cycles copied from the end of the five-cycle OFDM symbol.

In each case, the period $T_\Phi$ stays constant but the number of cycles (or parts of cycles) changes based on the frequency of the pilot OFDM symbol. In the specific example shown, the one-cycle case shows $T_\Phi$ is ⅛ of a cycle (FIG. 8), the two-cycle case shows $T_\Phi$ is 2/8 or ¼ of a cycle (FIG. 16), the three-cycle case shows $T_\Phi$ is ⅜ of a cycle (FIG. 17), the four-cycle case shows $T_\Phi$ is 4/8 or ½ of a cycle (FIG. 18), and the five-cycle case shows $T_\Phi$ is ⅝ of a cycle (FIG. 19). In a noisy or live data situation, the fractions of a cycle within the period $T_\Phi$ will not be exact as the theoretical numbers above.

Figure 20:
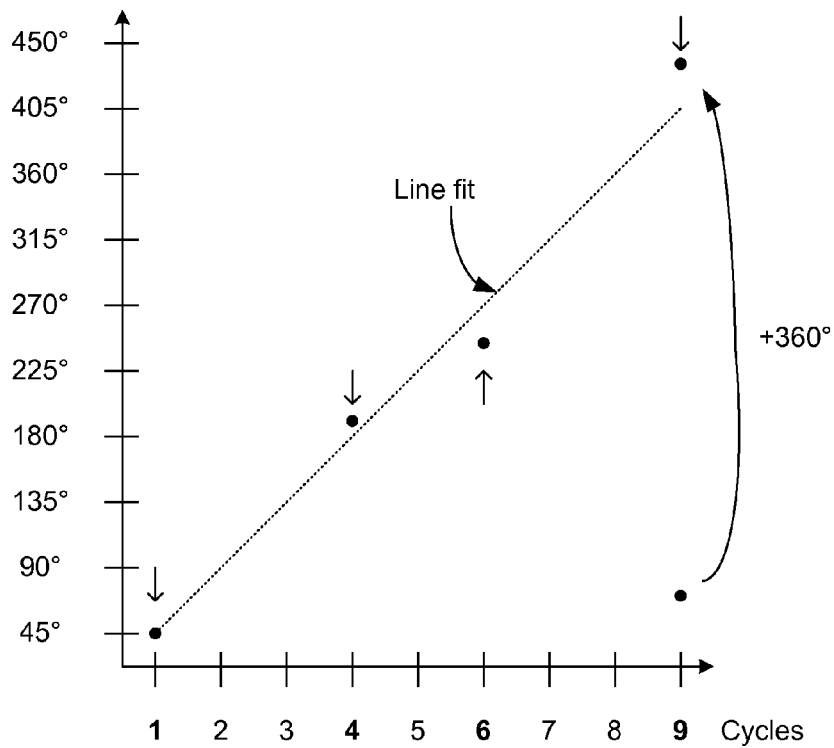
FIG. 20 illustrates line fitting, in accordance with some embodiments of the present invention.

FIG. 20 illustrates line fitting, in accordance with some embodiments of the present invention. Four pilot signals having a base number of cycles are shown: a first pilot having one cycle; a second pilot having four cycles; a third pilot having six cycles; and a fourth pilot having nine cycles. The zero crossing is determined and shown as a phase of the base cycle signal. In some embodiments, the zero crossing may be determined by measuring the amplitude at the beginning of the receiver window. In other embodiments, the zero crossing may be determined by taking a complex FFT of the samples that make up the $t_{window}$ and then obtaining the resulting phase of that pilot.

The single-cycle signal is shown with a phase delay $T_\Phi$ of 45°. Higher order phases (pilots having four or more cycles) are adjusted if necessary to account for wrapping past additional cycles. That is, n*360° where n is a positive integer may be added to the measured phase such that the phase measurement roughly falls on a line. For example, one or more full 360° cycles may be added to the phase measurement if any phase measurement jumps down by n*360°.

Here, the four-cycle signal is measured having a phase delay $T_\Phi$ of just larger than 180°. The six-cycle signal is measured having a phase delay $T_\Phi$ of just smaller than 270°. The nine-cycle signal is measured having a phase delay $T_\Phi$ of just larger than 405°. In these cases, the four and six-cycle case did not need one or more 360° cycles added but the nine-cycle case, if a phase of 45° was measured, 360° is added to the measurement such that the phase delay roughly falls on a line at 405°. That is, the phase for the nine-cycle signal may be 45°+n*360° (i.e., 45°+0*360°=45°, 45°+1*360°=405°, 45°+2*360°=765°, etc.) but n=1 or 45°+1*360°=405° best fits the trend. A line-fitting algorithm runs to find a best line through the points. The resulting slope defines the phase delay $T_\Phi$.

Figure 21:
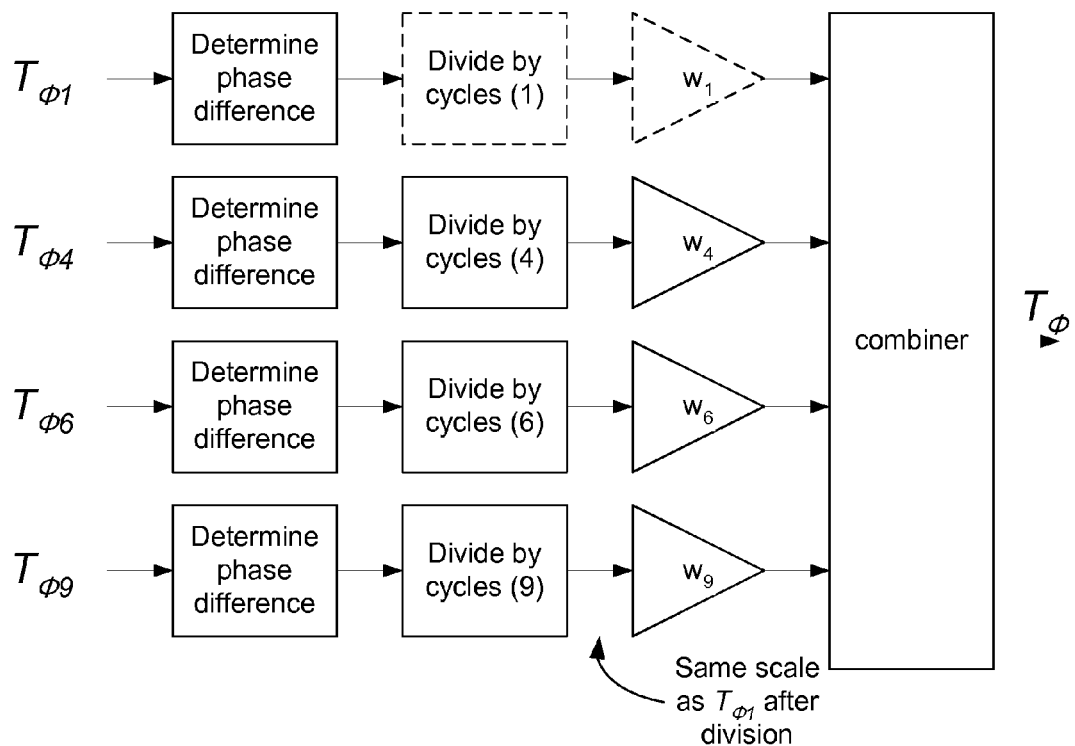
FIG. 21 shows a circuit to average phase delays, in accordance with some embodiments of the present invention.

FIG. 21 shows a circuit to average phase delays, in accordance with some embodiments of the present invention. The phase delay $T_\Phi$ for the single-cycle signal is measured. For multiple-cycle signals of the pilots, any whole cycle rollovers are taken into account by adding n*360° to the phase delay prior to dividing. The phase delay $T_\Phi$ for the four-cycle signal is measured and divided by four. The phase delay $T_\Phi$ for the six-cycle signal is measured and divided by six. The phase delay $T_\Phi$ for the nine-cycle signal is measured and divided by nine. After division, the phase delay $T_\Phi$ for each signal should be approximately equal to the phase delay $T_\Phi$ for the single-cycle signal. In some implementations, the optional weighting shown is used to emphasis the lower cycle signals over the higher cycle signals. In other implementations, the optional weighting is used to emphasis the higher cycle signals over the lower cycle signals. Still other implementations incorporate variable weighting emphasizing midrange cycle signals. The combiner sums the signals to arrive at an average phase delay $T_\Phi$ for a single-cycle signal.

Figure 22A:
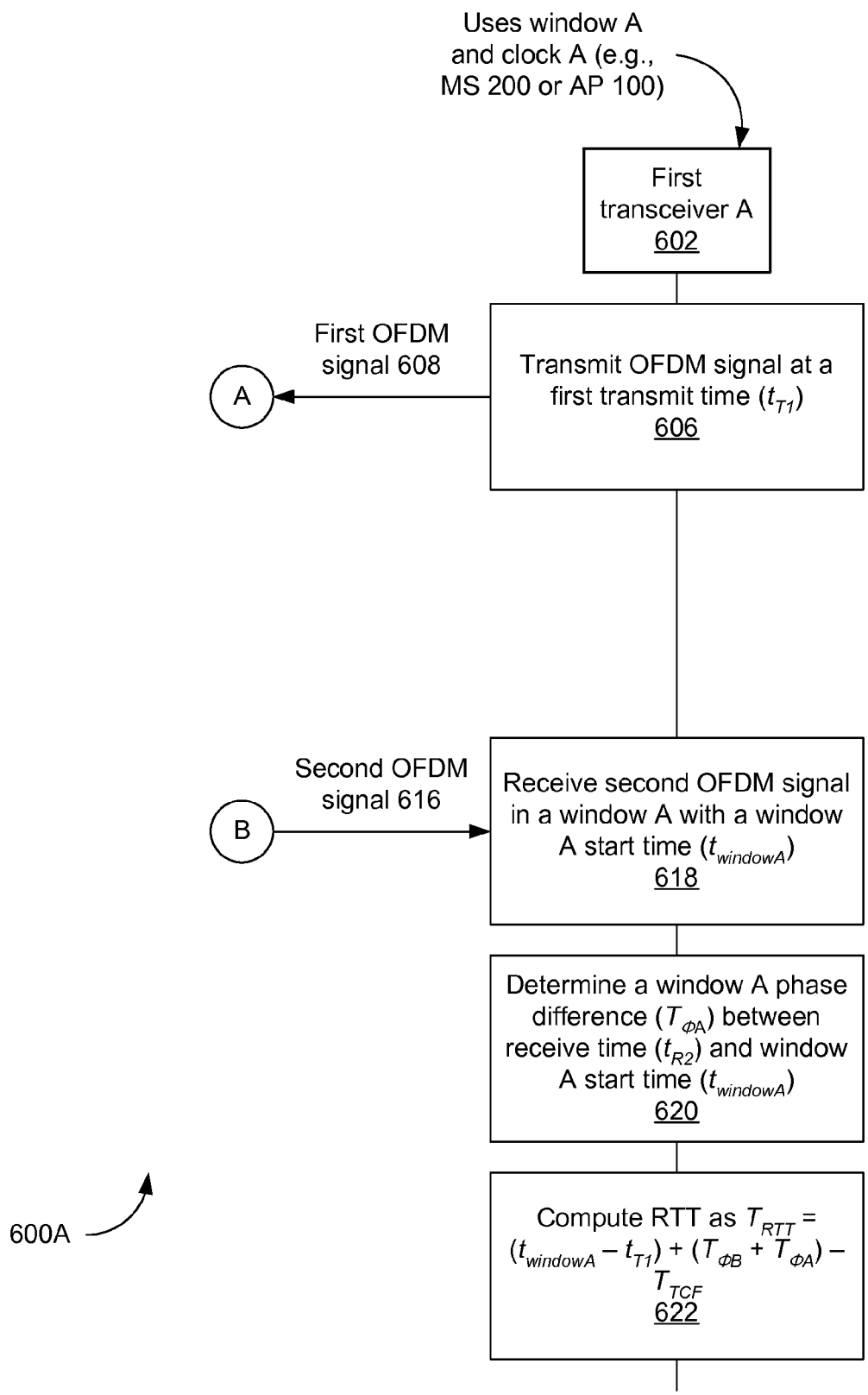
FIGS. 22A and 22B show a thread diagram of two transceivers used to determine an RTT, in accordance with some embodiments of the present invention.
Figure 22B:
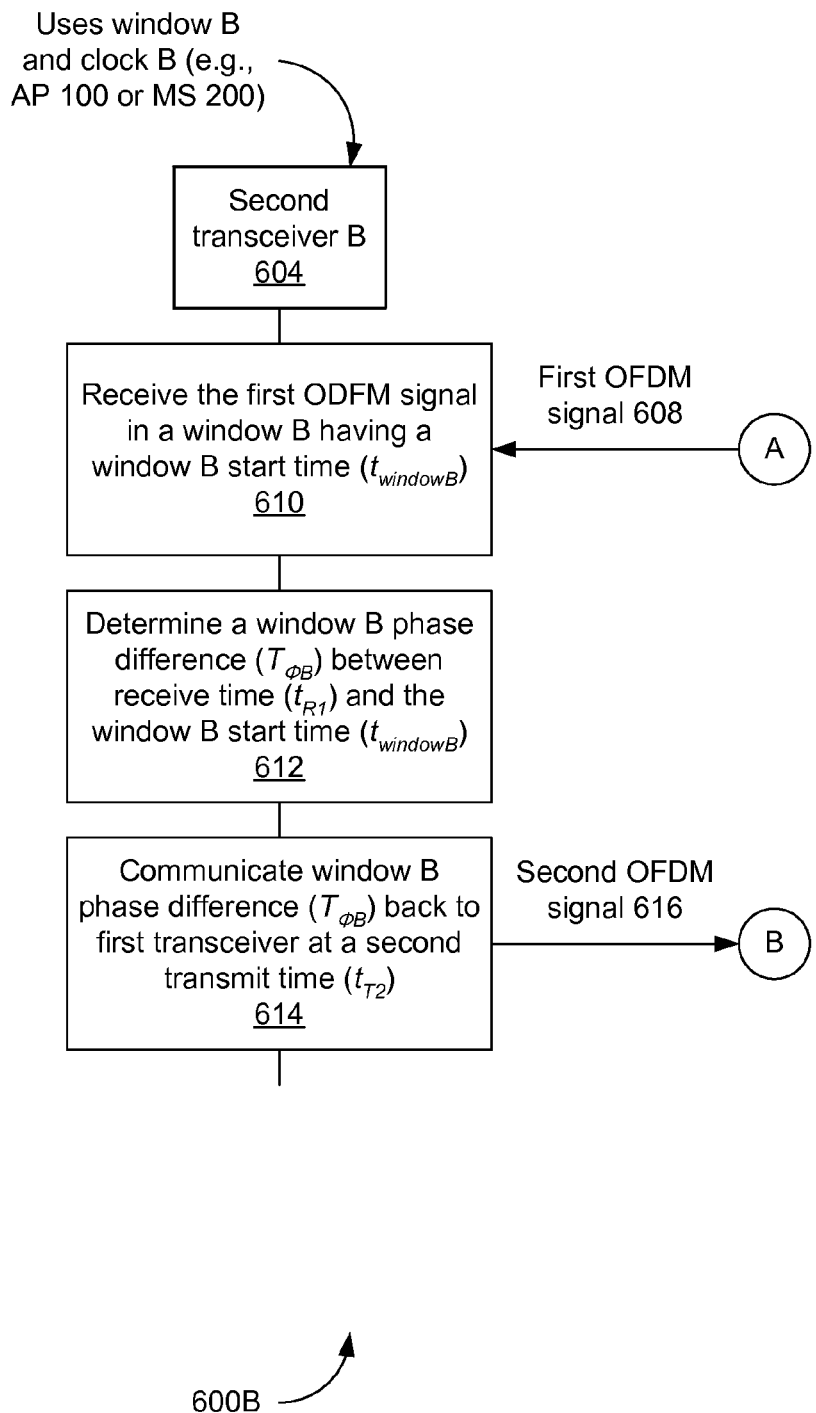

FIGS. 22A and 22B show a thread diagram of two transceivers used to determine an RTT, in accordance with some embodiments of the present invention. In FIG. 22A, a method 600A in a first transceiver A 602 is shown and in FIG. 22B, a method 600B in a second transceiver B 604 is shown, with figure interconnects A and B.

Beginning with FIG. 22A, a first OFDM signal 608 is communicated from the first transceiver A 602 to the second transceiver B 604 via figure interconnect A. In FIG. 22B, a second OFDM signal 616 is communicated from the second transceiver B 604 back to the first transceiver A 602 via figure interconnect B. The systems are used for estimating a round-trip time (RTT) of a first OFDM signal 608 and a second OFDM signal 616 through the second transceiver B 604. The first OFDM signal 608 and the second OFDM signal 616 may include a plurality of OFDM sub-channels carrying a signal having a cyclic prefix. The method may include selecting a first sub-channel of the first OFDM signal 608 (e.g., a first pilot signal). For example, a plurality of pilot signals may be selected from the plurality of sub-channels.

In FIG. 22A, at 606 a method 600A in the first transceiver A 602 includes transmitting the first OFDM signal 608 at a first transmit time ($t_{T1}$) from the first transceiver A 602 to the second transceiver B 604 via figure interconnect A. In FIG. 22B, a method 600B for estimating a receive time of the first OFDM signal 608 in the second transceiver B 604 begins via figure interconnect A. At 610, the second transceiver B 604 receives, from the first transceiver A 602, the first OFDM signal 608 in a window B having a window B start time ($t_{windowB}$). The window B may define a width of an OFDM symbol (e.g., 3.2 ms).

At 612, the second transceiver B 604 determines a window B phase difference ($T_{\Phi B}$) from a first difference between a receive time ($t_{R1}$) of the first OFDM signal 608 and the window B start time ($t_{windowB}$). Determining the window B phase difference ($T_{\Phi B}$) may include: (1) determining the first difference of the receive time ($t_{R1}$) of the first OFDM signal and the window B start time ($t_{windowB}$) of the window B (e.g., $T_{\Phi B1}$ of a single-cycle signal); (2) determining a second difference of a second receive time of the first OFDM signal and the window B start time ($t_{windowB}$) of the window B (e.g., $T_{\Phi B4}$ of a four-cycle signal); and (3) combining the first difference and the second difference to form the window B phase difference ($T_{\Phi B}$). Combining the first difference and the second difference may include an average (e.g., dividing by a number of cycles and a weighted average or other line fitting algorithm) of the first difference and the second difference. Additional differences from other pilot signals (e.g., $T_{\Phi B6}$ & $T_{\Phi B9}$) may be determined and combined.

At 614, the method optionally includes sending, from the second transceiver B 604 and to the first transceiver A 602, a message indicative of the window B phase difference ($T_{\Phi B}$). At 614, the second transceiver B 604 sends a second OFDM signal 616 at figure interconnect B.

Back to FIG. 22A, at 618, the first transceiver A 602 receives, at the first transceiver A 602 and from the second transceiver B 604 via figure interconnect B, the second OFDM signal 616 in a window A having a window A start time ($t_{windowA}$).

At 618, the first transceiver A 602 receives, from the second transceiver B 604, a message indicative of the window B phase difference ($T_{\Phi B}$) of a difference between a receive time ($t_{R1}$) of the first OFDM signal 608 and a window B start time ($t_{windowB}$) of the window B.

At 620, the first transceiver A 602 determines a window A phase difference ($T_{\Phi A}$) from a first difference of a receive time ($t_{R2}$) of the second OFDM signal 616 and the window A start time ($t_{windowA}$) of the window A (similar to the description above with reference to 612).

At 622, the first transceiver A 602 computes the RTT based on: (1) the window A start time ($t_{windowA}$) of the window A; (2) the first transmit time ($t_{T1}$); (3) the window A phase difference ($T_{\Phi A}$); (4) the window B phase difference ($T_{\Phi B}$); and (5) a latency ($T_{TCF}$).

The above-description round-trip OFDM signal is independent of whether the first transceiver 602 and the second transceiver 604 are asynchronous or synchronous. The method of positioning described removes the mobile device's clock from the final calculation, as shown by B's clock removal from FIG. 14 to FIG. 15. If the transceivers are synchronous, however, B's clock does not necessarily need to be removed and phase may be measured for a one-way OFDM signal.

For example, in synchronous LTE deployments and other synchronous networks, an OWT may be measured. A mobile device may be synchronous to the network, for example, by using GPS time. If synchronization is taken into account, ranging time in such a synchronous system no long depended on a round-trip signal. Therefore, position determination may be determined based on the single-way OFDM signal also known as the OWT.

The one-way travel time ($T_{onewayAB}$) shown in FIG. 12 may computed by the mobile device as the difference between transmit time ($t_{T1}$) and reception time ($t_{windowB}$) adjusted by the signal phase ($T_{\Phi B}$). The transmit time ($t_{T1}$) may be signaled to the mobile device and the difference between the transmit time ($t_{T1}$) and the reception time ($t_{windowB}$) may be considered based on a common clock (e.g., GPS time or CDMA time). Alternatively, instead of using signaling, the transmit time ($t_{T1}$) may be at a known epoch in time with a known phase relative to the networks to which they are synchronous with. The known epochs may occur periodically, such as every 160 ms or every one second. In this manner, it is not necessary to signal the transmit time ($t_{T1}$) to the mobile device because the transmit time ($t_{T1}$) may be inherently deduced as occurring at the previously occurring epoch in time.

That is, the time $t_{windowB}$ is associated with the clock of the second transceiver B, which is also associated with the time $t_{T1}$ associated with the clock of the first transceiver A. In such a manner, ranging may be determined based on an OFDM signal transmitted by the base station and received by the mobile device. Alternatively, the reverse one-way travel time for an OFDM signal transmitted by the mobile device and received by the base station. In this case, the one-way travel time is computed as $T_{onewayBA} = \{(t_{windowA} + T_{\Phi A}) - t_{T2}\}$ where parameters $t_{windowA}$ and $t_{T2}$ are both with reference to a common time. In either case, a transmitter transmits an OFDM signal that is received by a receiver in a receive window ($t_{window}$). The transmit time ($t_T$) is sent from the transmitter to the receiver in the same OFDM signal or in a separate message. Alternatively, the transmit time ($t_T$) is known to the receiver a priori. That is, the transmit time ($t_T$) may be deduced as being the closest epoch in time before the signal is received (e.g., transmission can only occur at the one second boundaries so the transmit time ($t_T$) is the second boundary occurring just before the signal is received).

Therefore, in some cases of one-way travel time, the receiver computes the one-way travel time of the OFDM signal. In other cases, the transmitter does not signal the transmit time ($t_T$) to the receiver but instead the receiver side signals the parameter $t_{window}$ to the transmitter side. In this case, the transmitter transmits an OFDM signal for ranging but then also computes the one-way travel time of the OFDM signal. In still other cases, the receiver deduces the transmit time ($t_T$) as occurring at the previous epoch in time.

The LTE standard allows a base station to transmit to a mobile device the base station's timing offset, if any, with respect to GPS time or CDMA time. For GPS time, the mobile device may determine the GPS time from a GPS position fix. In the near term, the GPS time will remain accurate enough to provide reliable even if the GPS receiver is disabled, for example, to save power. If a predetermined amount of time passes or it is determined that the GPS clock has degraded too much, the mobile device may acquire a new position fix to refresh the GPS time with a new clock.

Figure 23A:
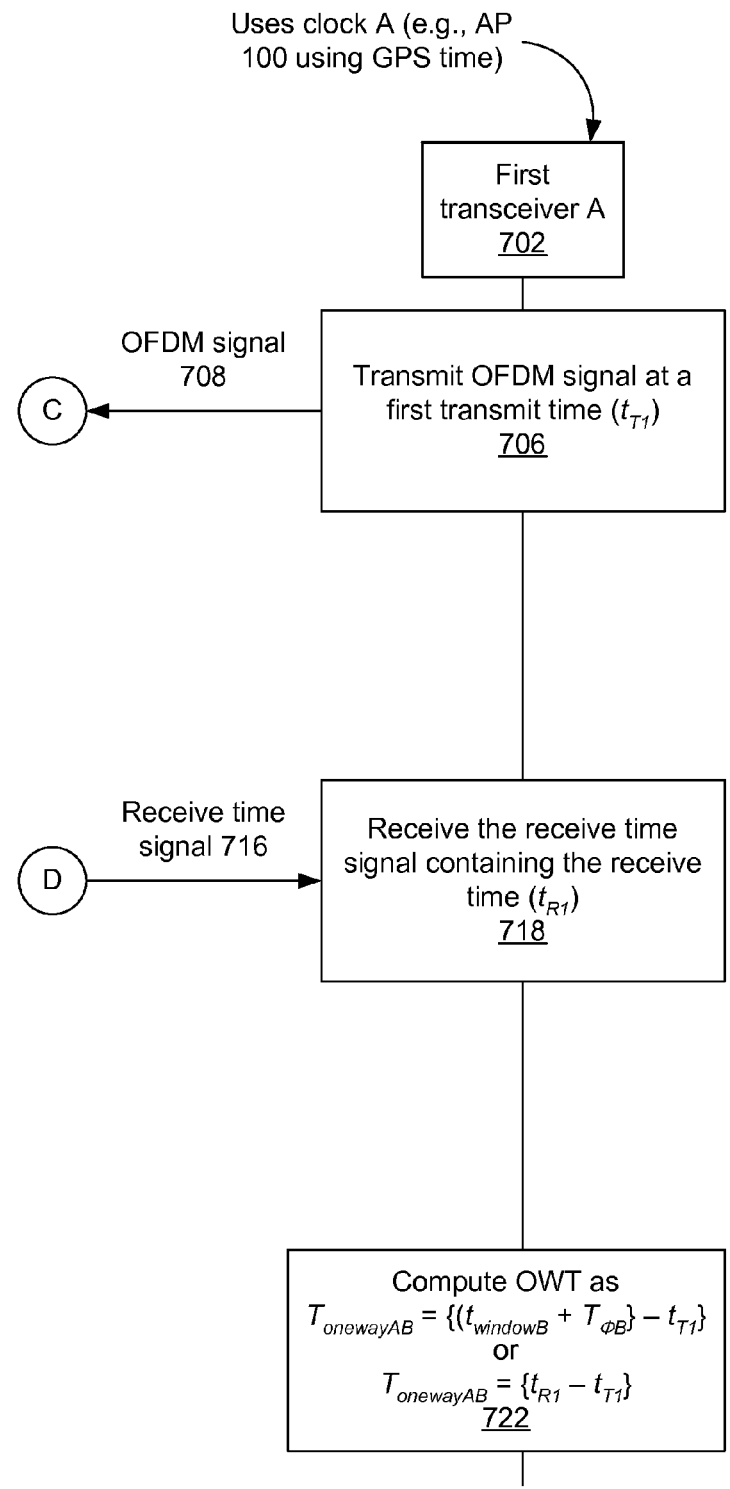
FIGS. 23A, 23B, 24A, 24B, 25A and 25B show thread diagrams of two transceivers used to determine an OWT, in accordance with some embodiments of the present invention.
Figure 23B:
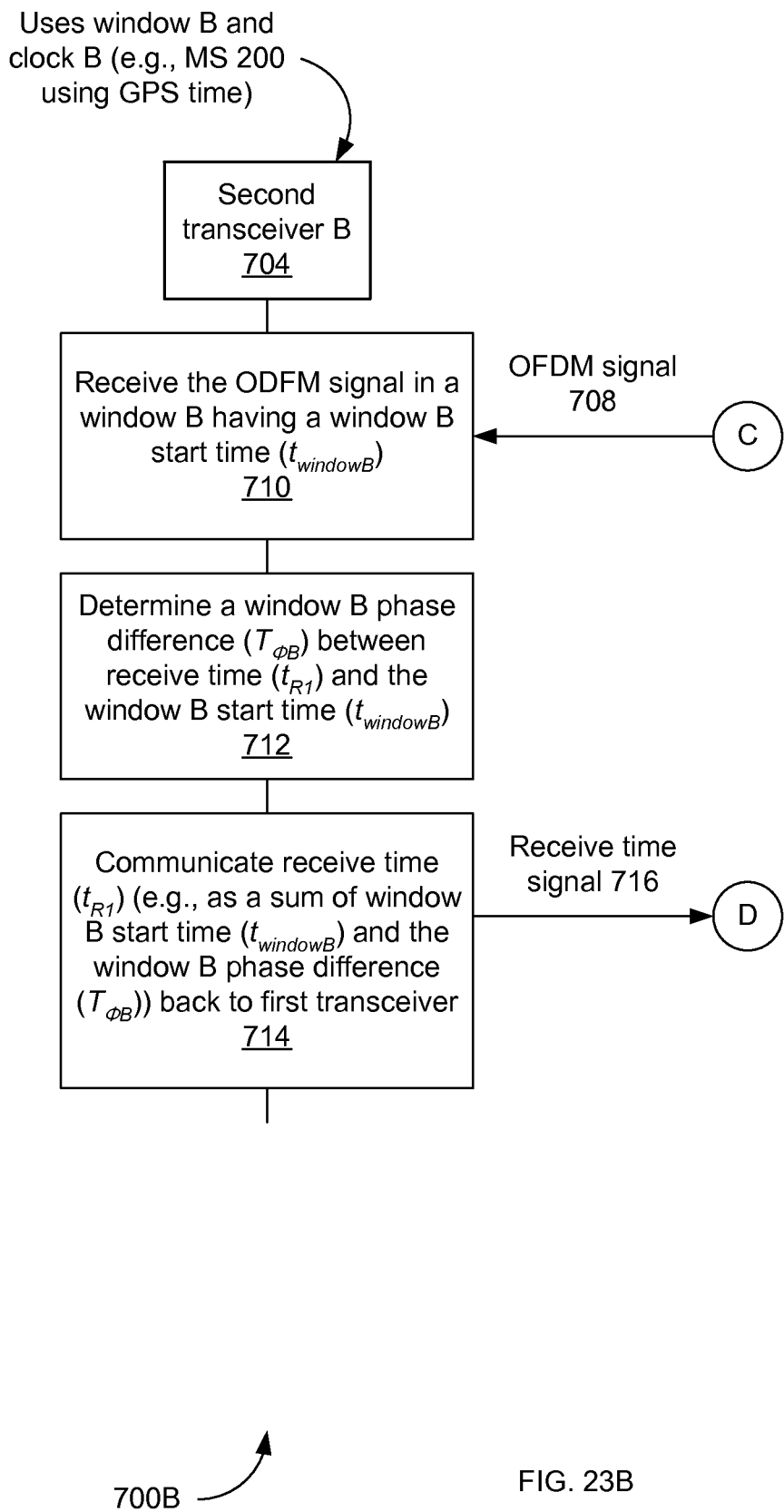
Figure 24A:
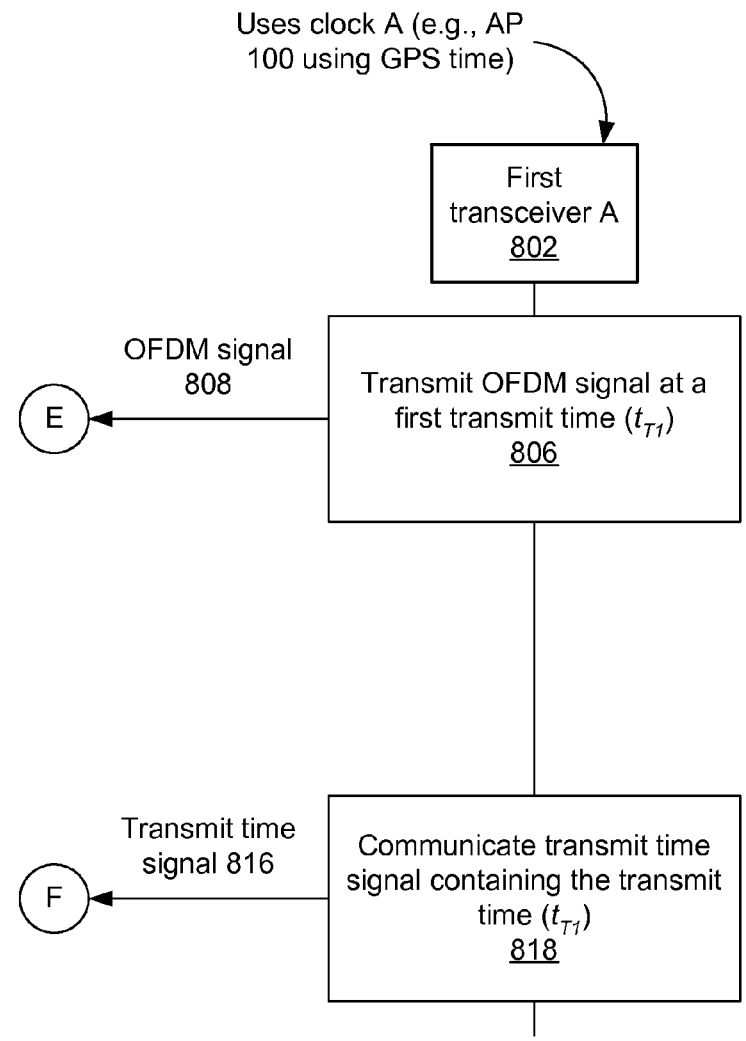
Figure 24B:
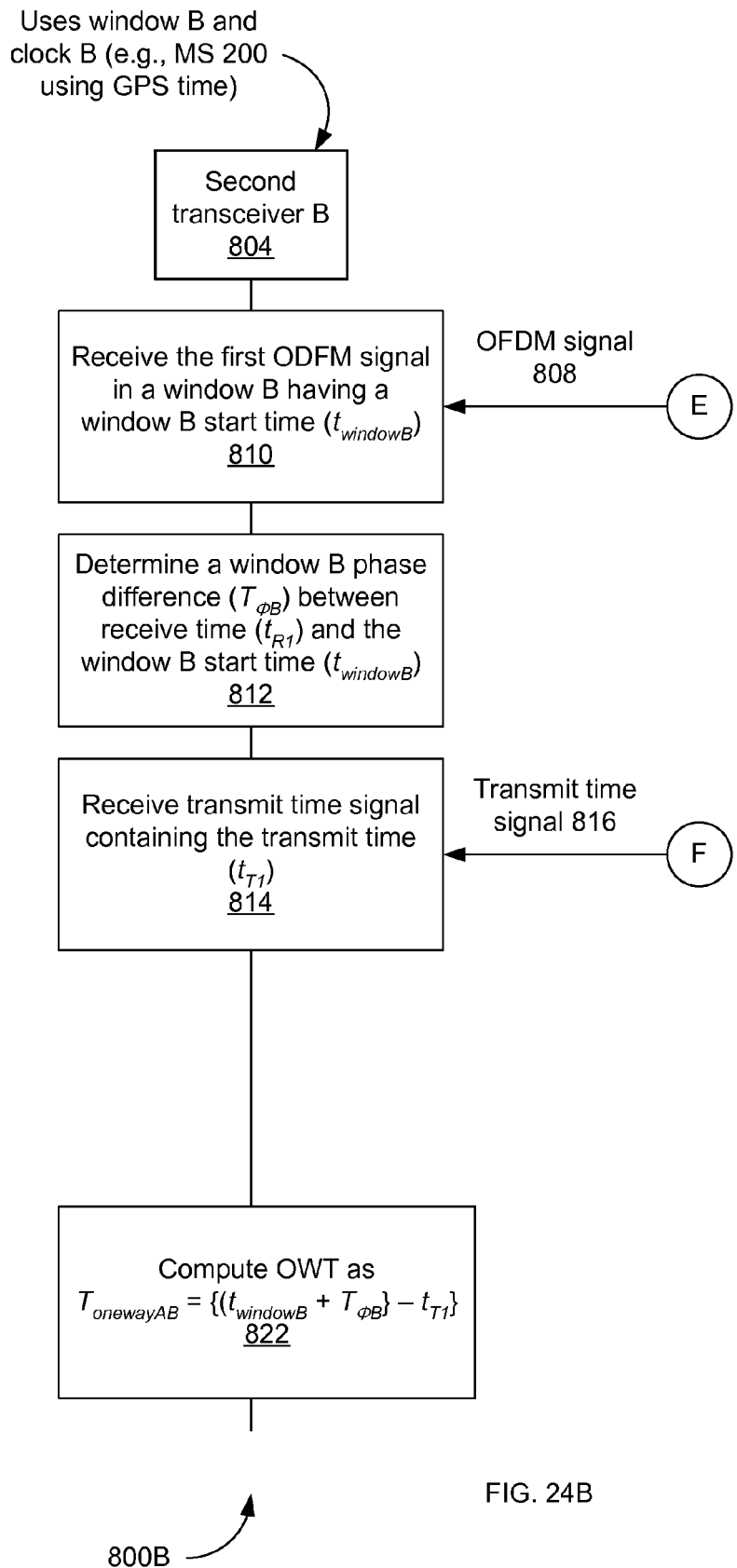
Figure 25A:
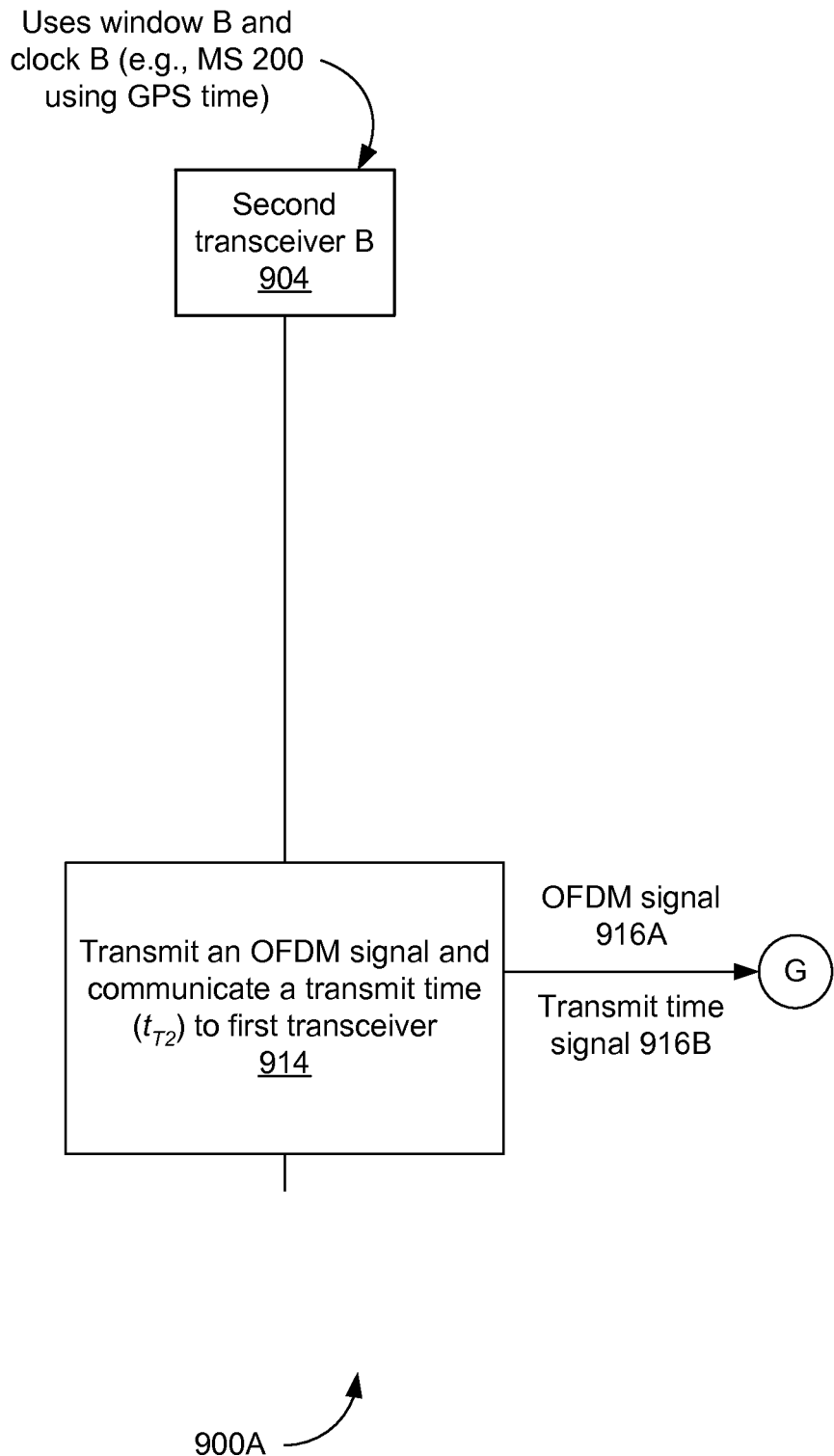
Figure 25B:
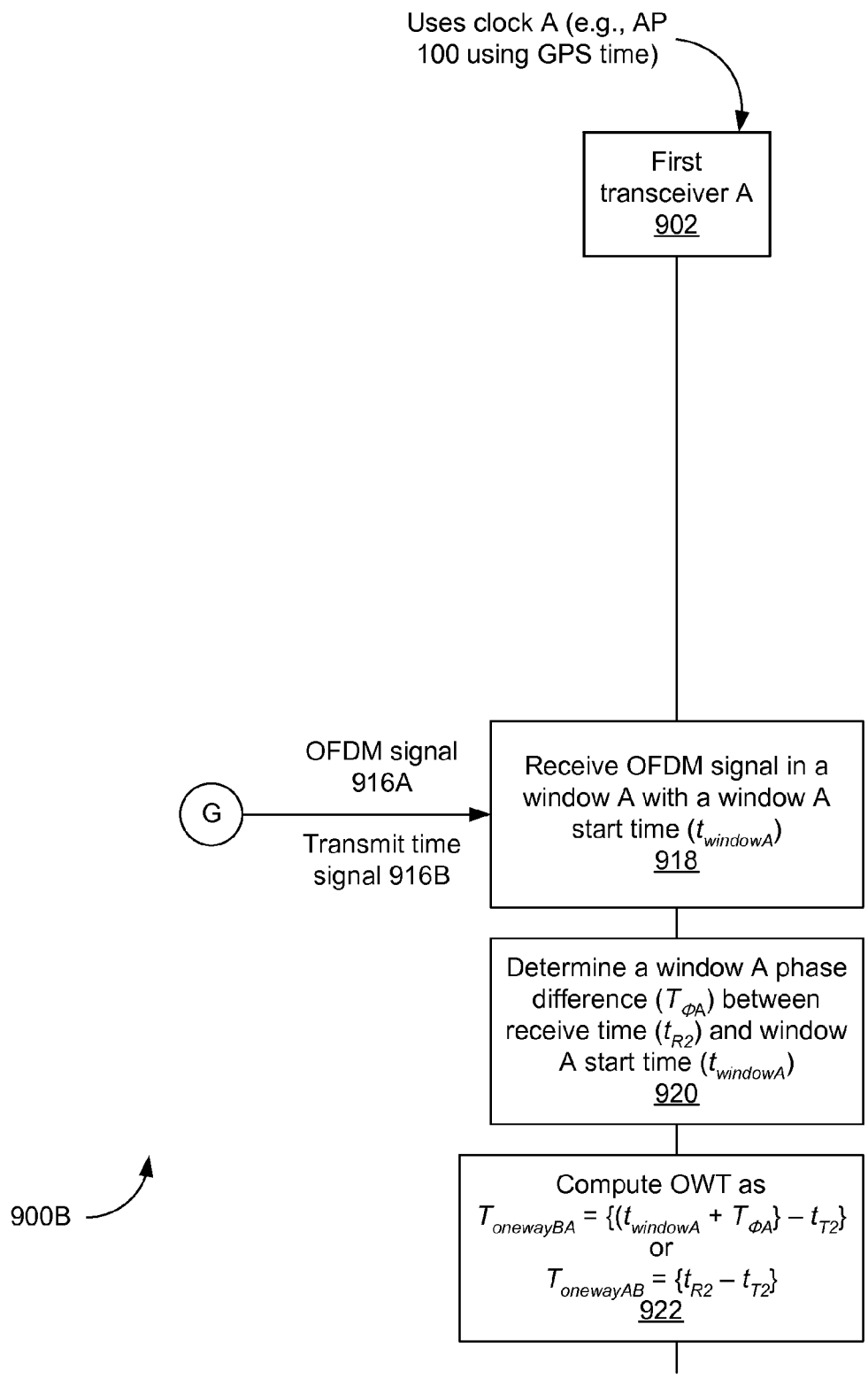

FIGS. 23A, 23B, 24A, 24B, 25A and 25B show thread diagrams of two transceivers used to determine an OWT (one-way time), in accordance with some embodiments of the present invention. The systems are used for estimating the OWT between a first transceiver A and a second transceiver B. In FIGS. 23A and 23B, an OWT from the first transceiver A to the second transceiver B is computed in the first transceiver A. In FIGS. 24A and 24B, the OWT from the first transceiver A to the second transceiver B is computed in the second transceiver B. In FIGS. 25A and 25B, an OWT from the second transceiver B to the first transceiver A is computed in the first transceiver A.

In FIGS. 23A and 23B, a method 700A is shown in a first transceiver A 702 and a method 700B is shown in a second transceiver A 704, shown with figure interconnects C and D. In FIG. 23A, the first transceiver A 702 transmits a ranging signal to the second transceiver B 704 but the first transceiver A 702 computes the one-way time. At 706, an OFDM signal 708 is transmitted from a first transceiver A 702 at a first transmit time ($t_{T1}$) to a second transceiver B 704, shown with figure interconnect C.

In FIG. 23B, at 710, the OFDM signal 708 is received at the second transceiver B 704 in a window B having a window B start time ($t_{windowB}$). At 712, the second transceiver B 704 determines a window B phase difference ($T_{\Phi B}$) from a first difference between a receive time ($t_{R1}$) of the OFDM signal 708 and the window B start time ($t_{windowB}$). At 714, the method optionally includes sending, from the second transceiver B 704 and to the first transceiver A 702, a message 716 shown via figure interconnect D and indicative of the receive time ($t_{R1}$).

Back to FIG. 22A, at 718, the first transceiver A 702 receives the receive time ($t_{R1}$) in message 716 via figure interconnect D. At 722, the first transceiver A 702 computes the OWT based on: (1) the window B start time ($t_{windowB}$) of the window B; (2) the window B phase difference ($T_{\Phi B}$); and (3) the first transmit time ($t_{T1}$) computed as $T_{onewayAB} = \{(t_{windowB} + T_{\Phi B}) - t_{T1}\}$ as shown in FIG. 12.

In FIGS. 24A and 24B, a method 800A in a first transceiver A 802 and a method 800B in a second transceiver are shown. The first transceiver A 802 transmits a ranging signal to the second transceiver B 804 and the second transceiver B 804 computes the one-way time. Beginning in FIG. 24A, at 806, an OFDM signal 808 is transmitted from a first transceiver A 802 at a first transmit time ($t_{T1}$) to a second transceiver B 804 as shown via figure interconnect E.

Next in FIG. 24B, at 810, the OFDM signal 808 is received via figure interconnect E at the second transceiver B 804 in a window B having a window B start time ($t_{windowB}$). At 812, the second transceiver B 804 determines a window B phase difference ($T_{\Phi B}$) from a first difference between a receive time ($t_{R1}$) of the OFDM signal 808 and the window B start time ($t_{windowB}$). At 814, the method optionally includes receiving, from the first transceiver A 802 and to the second transceiver B 804, a message (transmit time signal 816 via figure interconnect F) indicative of the transmit time ($t_{T1}$).

Back to FIG. 24A, at 818, the first transceiver A 802 sends the transmit time ($t_{T1}$) in message 816. Alternatively, the transmit time ($t_{T1}$) is deduced as occurring at the known previous epoch. Finally in FIG. 22B, at 822, the second transceiver B 804 computes the OWT based on: (1) the window B start time ($t_{windowB}$) of the window B; (2) the window B phase difference ($T_{\Phi B}$); and (3) the first transmit time ($t_{T1}$) computed as $T_{onewayAB} = \{(t_{windowB} + T_{\Phi B}) - t_{T1}\}$ as shown in FIG. 12.

In FIGS. 25A and 25B, a method 900A in a second transceiver B 904 and a method 900B in a first transceiver A 902 are shown. In FIG. 25A, at 914, an OFDM signal 916A is transmitted from a second transceiver B 904 at a transmit time ($t_{T2}$) to a first transceiver A 902 shown with figure interconnect G. The transmit time ($t_{T2}$) is also sent in a transmit time signal 916B from the second transceiver B 904 to a first transceiver A 902 also shown with figure interconnect G.

In FIG. 25B, at 918, the OFDM signal 916A and the transmit time ($t_{T2}$) 916B are received at the first transceiver A 902 via figure interconnect G. Alternatively, the OFDM signal 916A is received at the first transceiver A 902 and the transmit time ($t_{T2}$) 916B is deduced as being the previous epoch. The OFDM signal 916A is received in a window A having a window A start time ($t_{windowA}$). At 920, the first transceiver A 902 determines a window A phase difference ($T_{\Phi A}$) from a first difference between a receive time ($t_{R2}$) of the OFDM signal 916A and the window A start time ($t_{windowA}$). At 922, the first transceiver A 902 computes the OWT based on: (1) the window A start time ($t_{windowA}$) of the window A; (2) the window A phase difference ($T_{\Phi A}$); and (3) the transmit time ($t_{T2}$) computed as $T_{onewayAB} = \{(t_{windowA} + T_{\Phi A}) - t_{T2}\}$.

For the synchronous OWT methods (e.g., as described above referencing 23A, 23B, 24A, 24B, 25A and 25B), transmitter(s) and receiver(s) are closely synchronized to each other so the transmit or receive times are accurate relative to each other. Typically, when three transmitters or three receivers are base stations, the multiple base stations are accurately synchronized. However, when three transmitters or three receivers are mobile devices, the multiple mobile devices are less accurately synchronized and the resulting position fix may be less accurate because the path lengths are known with less certainty.

Three transmitters and one receiver may be used. When computing a position fix, the one receiver (e.g., a mobile device) may receive signals from at least three transmitters (e.g., access points, LTE base stations). The locations of the transmitters at the transmit time ($t_T$) are known. The one receiver may then compute the one receiver's position based on the path lengths from the three transmitters to the one receiver.

Alternatively, one transmitter and three receivers may be used. A transmitter (e.g., a mobile device) may transmit an OFDM signal to at least three receivers (e.g., access points, LTE base stations). The receivers share their receive times of the OFDM signal (e.g., with the transmitter, one of the receivers or a location server) to determine the path lengths from the transmitter to the three receivers. Based on the path lengths and the locations of the receivers at the time the OFDM signal is received, the position of the one transmitter may be determined.

Alternatively, the one receiver or three receivers send the received time(s) to a central point (e.g., the mobile device, an access point, a location server, a server in the network) to compute the location of the one receiver or one transmitter. Also, if not computed at the one receiver or one transmitter, the computed position fix may be sent back to the one receiver or one transmitter for use.

The transmitter(s) and receiver(s) (first transceiver A and second transceivers B) may be a combination of one or more mobile devices, access points, LTE base stations, base stations, and the like, and may be stationary or moving (as long as the locations of the three transmitters at transmit time or three receivers at receive time are known).

Transmitter(s) and receiver(s) may all be just base stations or just mobile devices. For example, a transmitter of a transmitted OFDM signal may be a first LTE base station (just configured and having an unknown location) and the receivers of the OFDM signal may be three different LTE base stations (with known locations). A position fix of the first LTE base station may be determined based on the receive time at the three different LTE base stations.

Alternatively, a transmitter of a transmitted OFDM signal may be a first mobile device and the receivers of the OFDM signal may be three different mobile devices. A position fix of the first mobile device may be determined based on the receive time at the three difference mobile devices as long as the positions of the three difference mobile devices at the time of reception are known and time synchronized (e.g., with GPS time) with the first mobile device. This assumes for some reason though that the mobile devices are synchronized by the first mobile device cannot determine its position via GPS signals.

Often, the transmitter is a mobile device with an unknown position and the receivers are three LTE base stations with known positions. In this case, the network usually computes a position fix of the mobile device based on the three receive times at the three LTE base stations and sends the computed position fix to the mobile device. Alternatively, the receiver is a mobile device with an unknown position and the transmitters are three LTE base stations with known positions. In this case, the mobile device usually computes a position fix for itself and may send the computed position fix to the network. In any case, additional receivers or transmitters (i.e., more than three) may be used to enable more precise determination of a position fix.

Figure 26A:
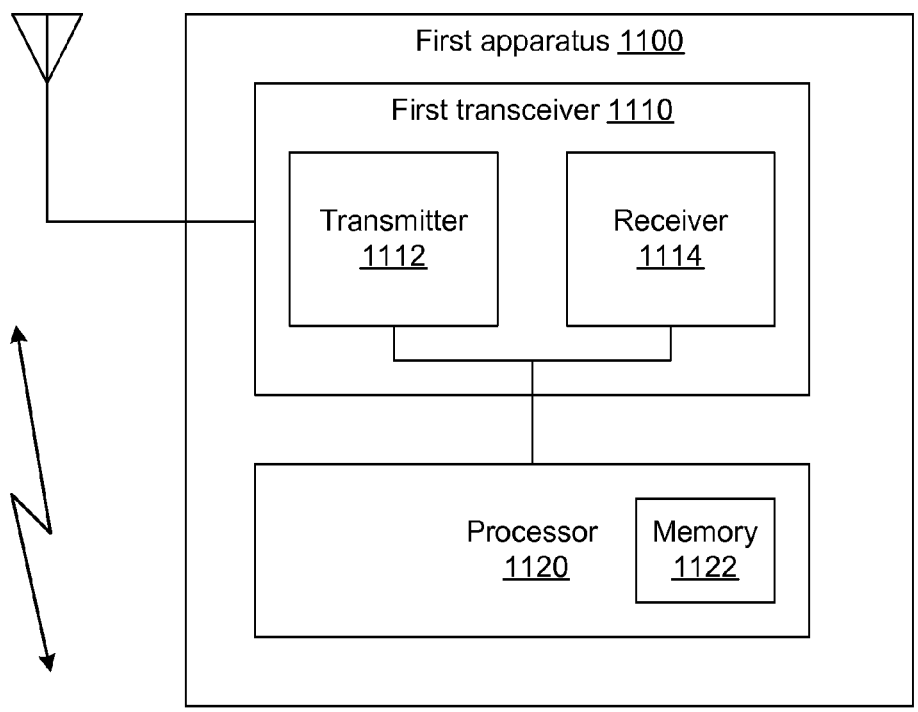
FIGS. 26A and 26B show apparatuses, in accordance with some embodiments of the present invention.
Figure 26B:
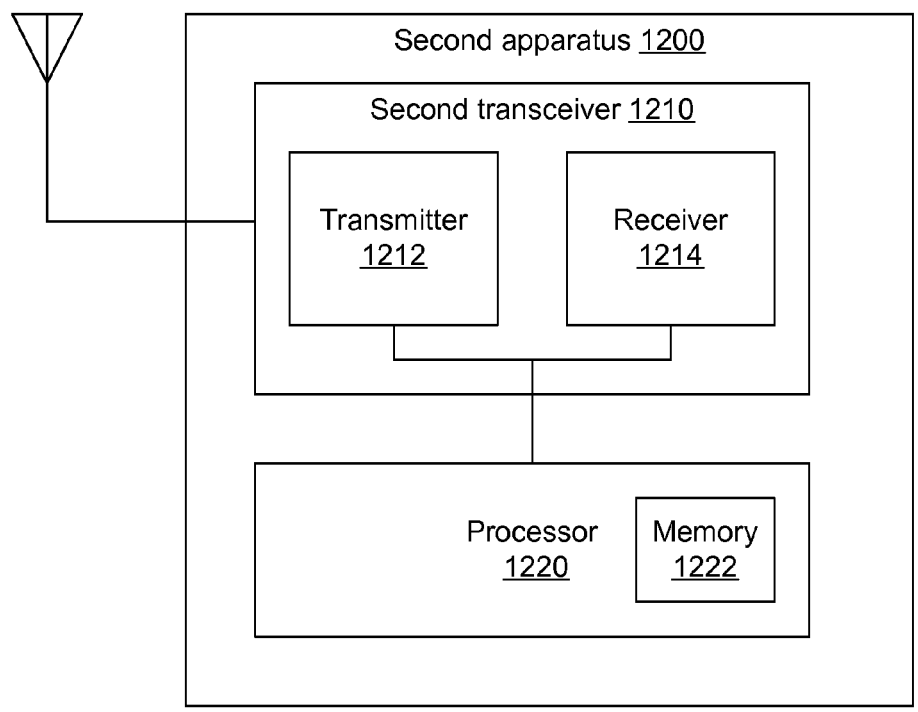

FIGS. 26A and 26B show apparatuses, in accordance with some embodiments of the present invention. In FIG. 26A, a first apparatus 1100 includes a first transceiver 1110 and a processor 1120. The entire first apparatus 1100 may sometimes be referred to as a first transceiver A (e.g., first transceiver 602, 702, 802 or 902). The first transceiver 1110 includes a transmitter 1112 and a receiver 1114. The processor 1120 is coupled to the first transceiver 1110. The first transceiver 1110 is also coupled to one or more antennas. Memory 1122 may be either embedded or attached to the processor 1120 and contain software or code to perform functions in the processor 1120.

In some embodiments as shown in FIGS. 22A and 26A, a first apparatus 1100 for estimating RTT in an OFDM system includes a transmitter 1112 acting as a means for transmitting a first OFDM signal at a first transmit time ($t_{T1}$) from a first transceiver to a second transceiver, a receiver 1114 acting as a means for receiving, at the first transceiver and from the second transceiver, a second OFDM signal in a window A having a window A start time ($t_{windowA}$), and a processor 1120 acting as a means for determining a window A phase difference ($T_{\Phi A}$) from a first difference of a receive time ($t_{R2}$) of the second OFDM signal and a window A start time ($t_{windowA}$) of the window A.

The receiver 1114 may further act as a means for receiving, at the first transceiver and from the second transceiver, a message indicative of a window B phase difference ($T_{\Phi B}$) of a difference between a receive time ($t_{R1}$) of the first OFDM signal and a window B start time ($t_{windowB}$) of a window B.

The processor 1120 acting as the means for determining the window A phase difference ($T_{\Phi A}$) may act as a means for determining the first difference of the receive time ($t_{R2}$) of the second OFDM signal and the window A start time ($t_{windowA}$) of the window A, a means for determining a second difference of a second receive time of the second OFDM signal and the window A start time ($t_{windowA}$) of (the window A, and a means for combining the first difference and the second difference to form the window A phase difference ($T_{\Phi A}$).

In some embodiments as shown in FIGS. 25B and 26A, a first apparatus 1100 for estimating an OWT in an OFDM system may include a receiver 1114 acting as a means for receiving an OFDM signal at a transmit time ($t_{T2}$) at a first transceiver 1110 and from a second transceiver 1210 in a window A having a window A start time ($t_{windowA}$) and a means for receiving the transmit time ($t_{T2}$) from the second transceiver 1210 sent to the first transceiver 1110, and a processor 1120 acting as a means for determining a window A phase difference ($T_{\Phi A}$) from a first difference of a receive time ($t_{R2}$) of the OFDM signal and a window A start time ($t_{windowA}$) of (the window A, and a means for computing the OWT based on (1) the window A start time ($t_{windowA}$) of the window A, (2) the window A phase difference ($T_{\Phi A}$), and (3) the transmit time ($t_{T2}$), wherein the first transceiver 1110 and the second transceiver 1210 are synchronous.

The processor 1120 in the first apparatus 1100 acting as the means for determining the window A phase difference ($T_{\Phi A}$) may act as a means for determining the first difference of the receive time ($t_{R2}$) of the OFDM signal and the window A start time ($t_{windowA}$) of the window A, a means for determining a second difference of a second receive time of the OFDM signal and the window A start time ($t_{windowA}$) of the window A, and a means for combining the first difference and the second difference to form the window A phase difference ($T_{\Phi A}$).

A further description of the first apparatus 1100 may be found with reference to functions performed by a first transceiver 602, 702, 802 or 902 found in FIGS. 22A, 23A, 24A and 25B described above.

In FIG. 26B, a second apparatus 1200 includes a second transceiver 1210 and a processor 1220. The entire second apparatus 1200 may sometimes be referred to as a second transceiver A (e.g., second transceiver 604, 704, 804 or 904). The second transceiver 1210 includes a transmitter 1212 and a receiver 1214. The processor 1220 is coupled to the second transceiver 1210. The second transceiver 1210 is also coupled to one or more antennas. Memory 1222 may be either embedded or attached to the processor 1220 and contain software or code to perform functions in the processor 1220.

In some embodiments as shown in FIGS. 22B and 26B, a second apparatus 1200 for estimating a receive time of a first OFDM signal in an OFDM system includes a receiver 1214 acting as a means for receiving, from a first transceiver 1110 and at a second transceiver 1210 of the second apparatus 1200, a first OFDM signal in a window B having a window B start time ($t_{windowB}$), and a processor 1120 may act as a means for determining a window B phase difference ($T_{\Phi B}$) from a first difference between a receive time ($t_{R1}$) of the first OFDM signal and the window B start time ($t_{windowB}$).

The processor 1220 acting as the means for determining the window B phase difference ($T_{\Phi B}$) may act as a means for determining the first difference of the receive time ($t_{R1}$) of the first OFDM signal and the window B start time ($t_{windowB}$) of the window B, a means for determining a second difference of a second receive time of the first OFDM signal and the window B start time ($t_{windowB}$) of the window B, and a means for combining the first difference and the second difference to form the window B phase difference ($T_{\Phi B}$).

In some embodiments as shown in FIGS. 24B and 26B, a second apparatus 1200 for estimating an OWT in an OFDM system may include a receiver 1214 acting as a means for receiving an OFDM signal at a first transmit time ($t_{T1}$) from a first transceiver 1110 sent to the second apparatus 1200 in a window B having a window B start time ($t_{windowB}$), and a processor 1220 acting as a means for determining a window B phase difference ($T_{\Phi B}$) from a first difference of a receive time ($t_{R1}$) of the OFDM signal and the window B start time ($t_{windowB}$) of (the window B, wherein the first transceiver 1110 and the second transceiver 1210 are synchronous.

The second apparatus 1200 may further include a transmitter 1212 acting as a means for sending the receive time ($t_{R1}$) from the second transceiver 1210 to the first transceiver 1110 for computing the OWT based on (1) the window B start time ($t_{windowB}$) of the window B, (2) the window B phase difference ($T_{\Phi B}$), and (3) the transmit time ($t_{T1}$).

The second apparatus 1200 may also include a receiver 1214 acting as a means for receiving the receive time ($t_{R1}$) at the second apparatus 1200 and from the first transceiver 1110, and the processor 1220 acting as a means for computing the OWT based on (1) the window B start time ($t_{windowB}$) of the window B, (2) the window B phase difference ($T_{\Phi B}$), and (3) the transmit time ($t_{T1}$).

The processor 1220 of the second apparatus 1200 acting as the means for determining the window B phase difference ($T_{\Phi B}$) may include the processor 1220 acting as a means for determining the first difference of the receive time ($t_{R1}$) of the OFDM signal and the window B start time ($t_{windowB}$) of the window B, as a means for determining a second difference of a second receive time of the OFDM signal and the window B start time ($t_{windowB}$) of the window B, and as a means for combining the first difference and the second difference to form the window B phase difference ($T_{\Phi B}$).

A further description of the second apparatus 1200 may be found with reference to functions performed by a second transceiver 604, 704, 804 or 904 found in FIGS. 22B, 23B, 24B and 25A described above.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for estimating a round-trip time (RTT) in an orthogonal frequency division multiplexing (OFDM) system, the method comprising:
    transmitting a first OFDM signal at a first transmit time ($t_{T1}$) from a first transceiver to a second transceiver;
    receiving, at the first transceiver and from the second transceiver, a second OFDM signal in a window A having a window A start time ($t_{windowA}$); and
    determining a window A phase difference ($T_{\Phi A}$) from a first difference of a receive time ($t_{R2}$) of the second OFDM signal and a window A start time ($t_{windowA}$) of the window A.

2. The method of claim 1, wherein the first OFDM signal and the second OFDM signal each comprises a plurality of OFDM sub-channels carrying a signal having a cyclic prefix.

3. The method of claim 1, further comprising receiving, at the first transceiver and from the second transceiver, a message indicative of a window B phase difference ($T_{\Phi B}$) of a difference between a receive time ($t_{R1}$) of the first OFDM signal and a window B start time ($t_{windowB}$) of a window B.

4. The method of claim 3, further comprising computing the RTT based on:
    the window A start time ($t_{windowA}$) of the window A;
    the first transmit time ($t_{T1}$);
    the window A phase difference ($T_{\Phi A}$);

the window B phase difference ($T_{\Phi B}$); and a latency ($T_{TCF}$).

5. The method of claim 1, wherein the window A and the window B each defines a width of an OFDM symbol.

6. The method of claim 1, wherein determining the window A phase difference ($T_{\Phi A}$) comprises:
determining the first difference of the receive time ($t_{R2}$) of the second OFDM signal and the window A start time ($t_{windowA}$) of the window A;
determining a second difference of a second receive time of the second OFDM signal and the window A start time ($t_{windowA}$) of the window A; and
combining the first difference and the second difference to form the window A phase difference ($T_{\Phi A}$).

7. The method of claim 6, wherein combining the first difference and the second difference comprises averaging the first difference and the second difference.

8. The method of claim 7, wherein the average comprises a weighted average.

9. An apparatus for estimating a round-trip time (RTT) in an orthogonal frequency division multiplexing (OFDM) system, the apparatus comprising:
means for transmitting a first OFDM signal at a first transmit time ($t_{T1}$) from a first transceiver to a second transceiver;
means for receiving, at the first transceiver and from the second transceiver, a second OFDM signal in a window A having a window A start time ($t_{windowA}$); and
means for determining a window A phase difference ($T_{\Phi A}$) from a first difference of a receive time ($t_{R2}$) of the second OFDM signal and a window A start time ($t_{windowA}$) of the window A.

10. The apparatus of claim 9, further comprising means for receiving, at the first transceiver and from the second transceiver, a message indicative of a window B phase difference ($T_{\Phi B}$) of a difference between a receive time ($t_{R1}$) of the first OFDM signal and a window B start time ($t_{windowB}$) of a window B.

11. The apparatus of claim 9, wherein the means for determining the window A phase difference ($T_{\Phi A}$) comprises:
means for determining the first difference of the receive time ($t_{R2}$) of the second OFDM signal and the window A start time ($t_{windowA}$) of the window A;
means for determining a second difference of a second receive time of the second OFDM signal and the window A start time ($t_{windowA}$) of the window A; and
means for combining the first difference and the second difference to form the window A phase difference ($T_{\Phi A}$).

12. An apparatus for estimating a round-trip time (RTT) in an orthogonal frequency division multiplexing (OFDM) system, the apparatus comprising:
a first transceiver comprising:
a transmitter configured to transmit a first OFDM signal at a first transmit time ($t_{T1}$) from the first transceiver to a second transceiver; and
a receiver configured to receive, at the first transceiver and from the second transceiver, a second OFDM signal in a window A having a window A start time ($t_{windowA}$); and a processor coupled to the first transceiver and configured to determine a window A phase difference ($T_{\Phi A}$) from a first difference of a receive time ($t_{R2}$) of the second OFDM signal and the window A start time ($t_{windowA}$).

13. The apparatus of claim 12, wherein the receiver is further configured to receive, at the first transceiver and from the second transceiver, a message indicative of a window B phase difference ($T_{\Phi B}$) of a difference between a receive time ($t_{R1}$) of the first OFDM signal and a window B start time ($t_{windowB}$) of a window B.

14. The apparatus of claim 12, wherein the processor is configured to determine the window A phase difference ($T_{\Phi A}$) by being configured to:
determine the first difference of the receive time ($t_{R2}$) of the second OFDM signal and the window A start time ($t_{windowA}$) of the window A;
determine a second difference of a second receive time of the second OFDM signal and the window A start time ($t_{windowA}$) of the window A; and
combine the first difference and the second difference to form the window A phase difference ($T_{\Phi A}$).

15. A non-transitory computer-readable storage medium transceiver for estimating a round-trip time (RTT) in an orthogonal frequency division multiplexing (OFDM) system, the non-transitory computer-readable storage medium including program code stored thereon, comprising program code to:
transmit a first OFDM signal at a first transmit time ($t_{T1}$) from a first transceiver to a second transceiver;
receive, at the first transceiver and from the second transceiver, a second OFDM signal in a window A having a window A start time ($t_{windowA}$); and
determine a window A phase difference ($T_{\Phi A}$) from a first difference of a receive time ($t_{R2}$) of the second OFDM signal and a window A start time ($t_{windowA}$) of the window A.

16. The non-transitory computer-readable storage medium of claim 15, wherein the program code further includes program code to receive, at the first transceiver and from the second transceiver, a message indicative of a window B phase difference ($T_{\Phi B}$) of a difference between a receive time ($t_{R1}$) of the first OFDM signal and a window B start time ($t_{windowB}$) of a window B.

17. The non-transitory computer-readable storage medium claim 15, wherein the program code to determine the window A phase difference ($T_{\Phi A}$) comprises program code to:
determine the first difference of the receive time ($t_{R2}$) of the second OFDM signal and the window A start time ($t_{windowA}$) of the window A;
determine a second difference of a second receive time of the second OFDM signal and the window A start time ($t_{windowA}$) of the window A; and
combine the first difference and the second difference to form the window A phase difference ($T_{\Phi A}$).

* * * * *